United States Patent
Kasada et al.

(10) Patent No.: US 10,937,456 B2
(45) Date of Patent: *Mar. 2, 2021

(54) MAGNETIC TAPE

(71) Applicant: FUJIFILM Corporation, Tokyo (JP)

(72) Inventors: Norihito Kasada, Minami-ashigara (JP); Takuto Kurokawa, Minami-ashigara (JP); Masahito Oyanagi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 427 days.

This patent is subject to a terminal disclaimer.

(21) Appl. No.: 15/442,961

(22) Filed: Feb. 27, 2017

(65) Prior Publication Data

US 2017/0249964 A1    Aug. 31, 2017

(30) Foreign Application Priority Data

Feb. 29, 2016 (JP) .............................. JP2016-037564

(51) Int. Cl.
    *G11B 5/735*     (2006.01)
    *G11B 5/702*     (2006.01)
    (Continued)

(52) U.S. Cl.
    CPC .............. *G11B 5/735* (2013.01); *G11B 5/702* (2013.01); *G11B 5/706* (2013.01); *G11B 5/7023* (2013.01); *G11B 5/71* (2013.01); *G11B 5/725* (2013.01); *G11B 5/73* (2013.01); *G11B 5/733* (2013.01); *G11B 5/78* (2013.01)

(58) Field of Classification Search
CPC ......... G11B 5/78; G11B 5/7305; G11B 5/733; G11B 5/735; G11B 5/702; G11B 5/7023; G11B 5/706; G11B 5/71; G11B 5/725; G11B 5/73
See application file for complete search history.

(56) References Cited

U.S. PATENT DOCUMENTS 3,966,686 A     6/1976   Asakura et al.
4,112,187 A     9/1978   Asakura et al.
(Continued)

FOREIGN PATENT DOCUMENTS

CN        1691139 A     11/2005
CN     101105949 A     1/2008
(Continued)

OTHER PUBLICATIONS

English machine translation of JP 63-298813, 1988.*
(Continued)

*Primary Examiner* — Holly Rickman
(74) *Attorney, Agent, or Firm* — Sughrue Mion, PLLC

(57) ABSTRACT

The magnetic tape has a magnetic layer containing ferromagnetic powder and binder on one surface of a nonmagnetic support and has a backcoat layer containing nonmagnetic powder and binder on the other surface thereof, wherein the thickness of the backcoat layer is less than or equal to 0.20 μm, the contact angle for 1-bromonaphthalene that is measured on the surface of the backcoat layer falls within a range of 10.0° to 30.0°, and the contact angle for 1-bromonaphthalene that is measured on the surface of the magnetic layer falls within a range of 45.0° to 55.0°.

15 Claims, 1 Drawing Sheet

(51) Int. Cl.
  *G11B 5/73*   (2006.01)
  *G11B 5/706*  (2006.01)
  *G11B 5/71*   (2006.01)
  *G11B 5/725*  (2006.01)
  *G11B 5/733*  (2006.01)
  *G11B 5/78*   (2006.01)

(56) References Cited

U.S. PATENT DOCUMENTS

| | | | |
|---|---|---|---|
| 4,425,404 A | 1/1984 | Suzuki et al. | |
| 4,693,930 A | 9/1987 | Kuo et al. | |
| 4,746,569 A | 5/1988 | Takahashi et al. | |
| 4,825,317 A | 4/1989 | Rausch | |
| 5,006,406 A | 4/1991 | Kovacs et al. | |
| 5,242,752 A | 9/1993 | Isobe et al. | |
| 5,419,938 A | 5/1995 | Kagotani et al. | |
| 5,445,881 A | 8/1995 | He | |
| 5,474,814 A | 12/1995 | Komatsu et al. | |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A | 7/1997 | Ejiri et al. | |
| 5,689,384 A | 11/1997 | Albrecht et al. | |
| 5,728,454 A | 3/1998 | Inaba et al. | |
| 5,786,074 A | 7/1998 | Soui | |
| 5,827,600 A * | 10/1998 | Ejiri | G11B 5/70 |
| | | | 428/141 |
| 5,835,314 A | 11/1998 | Moodera et al. | |
| 6,099,957 A | 8/2000 | Yamamoto et al. | |
| 6,183,606 B1 | 2/2001 | Kuo et al. | |
| 6,207,252 B1 | 3/2001 | Shimomura | |
| 6,228,461 B1 | 5/2001 | Sueki et al. | |
| 6,254,964 B1 | 7/2001 | Saito et al. | |
| 6,261,647 B1 | 7/2001 | Komatsu et al. | |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 | 11/2003 | Buczek et al. | |
| 6,686,022 B2 | 2/2004 | Takano et al. | |
| 6,770,359 B2 | 8/2004 | Masaki | |
| 6,791,803 B2 | 9/2004 | Saito et al. | |
| 6,835,461 B1 | 12/2004 | Yamagata et al. | |
| 6,893,746 B1 | 5/2005 | Kirino et al. | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 6,994,925 B2 | 2/2006 | Masaki | |
| 7,014,927 B2 | 3/2006 | Sueki et al. | |
| 7,029,726 B1 | 4/2006 | Chen et al. | |
| 7,153,366 B1 | 12/2006 | Chen et al. | |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,656,602 B2 | 2/2010 | Iben et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,279,739 B2 | 10/2012 | Kanbe et al. | |
| 8,318,242 B2 | 11/2012 | Bradshaw et al. | |
| 8,524,108 B2 | 9/2013 | Hattori | |
| 8,535,817 B2 | 9/2013 | Imaoka | |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,159,341 B2 | 10/2015 | Bradshaw et al. | |
| 9,311,946 B2 | 4/2016 | Tanaka et al. | |
| 9,324,343 B2 | 4/2016 | Bradshaw et al. | |
| 9,495,985 B2 | 11/2016 | Biskeborn et al. | |
| 9,530,444 B2 | 12/2016 | Kasada | |
| 9,542,967 B2 | 1/2017 | Sekiguchi et al. | |
| 9,564,161 B1 | 2/2017 | Cherubini et al. | |
| 9,601,146 B2 | 3/2017 | Kasada et al. | |
| 9,704,425 B2 | 7/2017 | Zhang et al. | |
| 9,704,525 B2 | 7/2017 | Kasada | |
| 9,704,527 B2 | 7/2017 | Kasada | |
| 9,711,174 B2 | 7/2017 | Kasada et al. | |
| 9,721,605 B2 | 8/2017 | Oyanagi et al. | |
| 9,721,606 B2 | 8/2017 | Kasada | |
| 9,721,607 B2 | 8/2017 | Tada et al. | |
| 9,748,026 B2 | 8/2017 | Shirata | |
| 9,773,519 B2 | 9/2017 | Kasada et al. | |
| 9,779,772 B1 | 10/2017 | Kasada et al. | |
| 9,837,104 B1 | 12/2017 | Biskeborn | |
| 9,837,116 B2 | 12/2017 | Ozawa et al. | |
| 9,959,894 B2 | 5/2018 | Omura | |
| 9,972,351 B1 | 5/2018 | Kaneko et al. | |
| 9,978,414 B1 | 5/2018 | Kaneko et al. | |
| 9,984,710 B2 | 5/2018 | Kasada | |
| 9,984,712 B1 | 5/2018 | Ozawa | |
| 9,984,716 B1 | 5/2018 | Kaneko et al. | |
| 10,008,230 B1 | 6/2018 | Ozawa et al. | |
| 10,026,430 B2 | 7/2018 | Kasada et al. | |
| 10,026,433 B2 | 7/2018 | Kasada et al. | |
| 10,026,434 B2 | 7/2018 | Oyanagi et al. | |
| 10,026,435 B2 | 7/2018 | Kasada et al. | |
| 10,062,403 B1 | 8/2018 | Kasada et al. | |
| 10,074,393 B2 | 9/2018 | Kaneko et al. | |
| 10,134,433 B2 | 11/2018 | Kasada et al. | |
| 10,170,144 B2 | 1/2019 | Ozawa et al. | |
| 10,438,621 B2 * | 10/2019 | Kasada | G11B 5/78 |
| 2001/0038928 A1 | 11/2001 | Nakamigawa et al. | |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0128453 A1 | 7/2003 | Saito et al. | |
| 2003/0170498 A1 | 9/2003 | Inoue | |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0072025 A1 | 4/2004 | Kishimoto et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 * | 12/2004 | Ejiri | G11B 5/584 |
| | | | 428/837 |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1 | 2/2006 | Kuse et al. | |
| 2006/0056095 A1 | 3/2006 | Saitou | |
| 2006/0068232 A1 | 3/2006 | Mikamo et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0073816 A1 | 3/2010 | Komori et al. | |
| 2010/0081011 A1 | 4/2010 | Nakamura | |
| 2010/0134929 A1 | 6/2010 | Ito | |
| 2010/0227201 A1 | 9/2010 | Sasaki et al. | |

(56) References Cited

U.S. PATENT DOCUMENTS

| | | |
|---|---|---|
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0152891 A1 | 6/2012 | Brown et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 * | 12/2014 | Kikuchi ............... G11B 5/7013  252/62.54 |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0337944 A1 | 11/2017 | Biskeborn et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |
| 2019/0295587 A1 | 9/2019 | Kasada |
| 2020/0005814 A1 | 1/2020 | Kasada et al. |
| 2020/0005818 A1 | 1/2020 | Kasada et al. |
| 2020/0005822 A1 | 1/2020 | Kasada et al. |
| 2020/0005827 A1 | 1/2020 | Ozawa et al. |

(56) References Cited

U.S. PATENT DOCUMENTS

| | | | |
|---|---|---|---|
| 2020/0035262 | A1 | 1/2020 | Kasada |
| 2020/0126589 | A1 | 4/2020 | Iwamoto et al. |

FOREIGN PATENT DOCUMENTS

| | | | |
|---|---|---|---|
| CN | 105324650 | A | 2/2016 |
| DE | 101 46 429 | A1 | 3/2002 |
| GB | 2495356 | A | 4/2013 |
| JP | 61-11924 | A | 1/1986 |
| JP | 61-139923 | A | 6/1986 |
| JP | 61-139932 | A | 6/1986 |
| JP | 63-129519 | A | 6/1988 |
| JP | 63-249932 | A | 10/1988 |
| JP | 64-057422 | A | 3/1989 |
| JP | 64-60819 | A | 3/1989 |
| JP | 1-276424 | A | 11/1989 |
| JP | 5-258283 | A | 10/1993 |
| JP | 5-298653 | A | 11/1993 |
| JP | 7-57242 | A | 3/1995 |
| JP | 9-73626 | A | 3/1997 |
| JP | 11-110743 | A | 4/1999 |
| JP | 11-175949 | A | 7/1999 |
| JP | 11-273051 | A | 10/1999 |
| JP | 2000-251240 | A | 9/2000 |
| JP | 2002-157726 | A | 5/2002 |
| JP | 2002-329605 | A | 11/2002 |
| JP | 2002-367142 | A | 12/2002 |
| JP | 2002-367318 | A | 12/2002 |
| JP | 2003-77116 | A | 3/2003 |
| JP | 2003-323710 | A | 11/2003 |
| JP | 2004-005820 | A | 1/2004 |
| JP | 2004-114492 | A | 4/2004 |
| JP | 2004-133997 | A | 4/2004 |
| JP | 2004-185676 | A | 7/2004 |
| JP | 2005-38579 | A | 2/2005 |
| JP | 2005-092967 | A | 4/2005 |
| JP | 2005-243063 | A | 9/2005 |
| JP | 2005-243162 | A | 9/2005 |
| JP | 2006-92672 | A | 4/2006 |
| JP | 2006-286114 | A | 10/2006 |
| JP | 2007-265555 | A | 10/2007 |
| JP | 2007-273039 | A | 10/2007 |
| JP | 2007-287310 | A | 11/2007 |
| JP | 2007-297427 | A | 11/2007 |
| JP | 2008-047276 | A | 2/2008 |
| JP | 2008-243317 | A | 10/2008 |
| JP | 2009-245515 | A | 10/2009 |
| JP | 2009-283082 | A | 12/2009 |
| JP | 2010-036350 | A | 2/2010 |
| JP | 2010-049731 | A | 3/2010 |
| JP | 2011-48878 | A | 3/2011 |
| JP | 2011-138566 | A | 7/2011 |
| JP | 2011-210288 | A | 10/2011 |
| JP | 2011-225417 | A | 11/2011 |
| JP | 2012-38367 | A | 2/2012 |
| JP | 2012-043495 | A | 3/2012 |
| JP | 2012-203955 | A | 10/2012 |
| JP | 2013-25853 | A | 2/2013 |
| JP | 2013-77360 | A | 4/2013 |
| JP | 2013-164889 | A | 8/2013 |
| JP | 2014-15453 | A | 1/2014 |
| JP | 2014-179149 | A | 9/2014 |
| JP | 2015-39801 | A | 3/2015 |
| JP | 2015-111484 | A | 6/2015 |
| JP | 2016-15183 | A | 1/2016 |
| JP | 2016-502224 | A | 1/2016 |
| JP | 2016-051493 | A | 4/2016 |
| JP | 2016-071912 | A | 5/2016 |
| JP | 2016-71926 | A | 5/2016 |
| JP | 2016-126817 | A | 7/2016 |
| JP | 2016-139451 | A | 8/2016 |
| JP | 2016-177851 | A | 10/2016 |

OTHER PUBLICATIONS

U.S. Appl. No. 15/422,821, Allowed.
U.S. Appl. No. 15/625,428, Allowed.
U.S. Appl. No. 15/848,173, Allowed; QPIDS filed.
U.S. Appl. No. 15/380,309, Allowed.
U.S. Appl. No. 15/854,410, U.S. Pat. No. 9,972,315.
U.S. Appl. No. 15/854,474, U.S. Appl. No. 9,978,414.
U.S. Appl. No. 15/899,430, Allowed.
U.S. Appl. No. 15/920,515, Allowed.
U.S. Appl. No. 15/920,517, Allowed.
U.S. Appl. No. 15/920,538, Allowed.
U.S. Appl. No. 15/920,544, Allowed.
U.S. Appl. No. 15/900,141, Allowed.
U.S. Appl. No. 15/900,345, Allowed.
U.S. Appl. No. 15/900,379, Allowed.
U.S. Appl. No. 15/920,592, Allowed.
U.S. Appl. No. 16/038,339, Allowed.
Office Action dated Apr. 26, 2017 which issued during the prosecution of U.S. Appl. No. 15/388,864.
Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated Jun. 9, 2017 which issued during the prosecution of U.S. Appl. No. 15/388,864.

(56) References Cited

OTHER PUBLICATIONS

Office Action dated May 30, 2018 which issued during the prosecution of U.S. Appl. No. 15/388,911.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
"Introduction to TMR Magnetic Sensors", Anonymous, Mar. 12, 2015, MR Sensor Technology, pp. 1-4 (Year: 2015).
Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Apr. 5, 2018, which issued during the prosecution of U.S. Appl. No. 14/867,752.
Notice of Allowance dated Aug. 28, 2018 from the US Patent & Trademark Office in U.S. Appl. No. 15/422,821.
Notice of Allowance dated Aug. 30, 2017, which issued during the prosecution of U.S. Appl. No. 15/466,143.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 2, 2017, which issued during the prosecution of U.S. Appl. No. 15/218,190.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated Mar. 19, 2018, which issued during the prosecution of U.S. Appl. No. 15/378,907.
Notice of Allowance dated Mar. 21, 2018, which issued during the prosecution of U.S. Appl. No. 15/241,286.
Notice of Allowance dated Mar. 21, 2018, which issued during the prosecution of U.S. Appl. No. 15/241,297.
Notice of Allowance dated Mar. 27, 2018, which issued during the prosecution of U.S. Appl. No. 15/241,631.
Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543.
Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Feb. 28, 2019 in U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated May 4, 2018 which issued during the prosecution of U.S. Appl. No. 15/422,821.
Office Action dated Nov. 28, 2018, which issued during the prosecution of U.S. Appl. No. 15/899,587.

(56) References Cited

OTHER PUBLICATIONS

Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Oct. 5, 2017, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Apr. 4, 2019 in U.S. Appl. No. 16/184,312.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 27, 2018 in U.S. Appl. No. 15/900,334.
Office Action dated Dec. 31, 2018 in U.S. Appl. No. 16/009,603.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 5, 2019 in U.S. Appl. No. 16/038,339.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 6, 2019 in U.S. Appl. No. 15/854,403.
Office Action dated Mar. 7, 2019 in U.S. Appl. No. 15/854,439.
Office Action dated Nov. 14, 2018 in U.S. Appl. No. 16/100,289.
Office Action dated Nov. 19, 2018 in U.S. Appl. No. 15/900,141.
Notice of Allowance dated Mar. 5, 2019 in U.S. Appl. No. 16/009,603.
Office Action dated May 23, 2019 in U.S. Appl. No. 15/388,911.
Notice of Allowance dated May 24, 2019 in U.S. Appl. No. 16/143,646.
Notice of Allowance dated May 24, 2019 in U.S. Appl. No. 15/900,345.
Notice of Allowance dated May 28, 2019 in U.S. Appl. No. 15/920,616.
Notice of Allowance dated May 29, 2019 in U.S. Appl. No. 15/900,334.
Notice of Allowance dated May 29, 2019 in U.S. Appl. No. 15/900,160.
Notice of Allowance dated May 30, 2019 in U.S. Appl. No. 15/900,230.
Notice of Allowance dated Jun. 6, 2019 in U.S. Appl. No. 15/854,383.
Office Action dated Jun. 6, 2019 in U.S. Appl. No. 15/899,587.
Office Action dated Jun. 10, 2019 in U.S. Appl. No. 15/920,518.
Office Action dated Mar. 5, 2019 in U.S. Appl. No. 15/443,026.
U.S. Appl. No. 15/280,195, Pending.
U.S. Appl. No. 15/422,944, Allowed; QPIDS filed.
U.S. Appl. No. 15/619,012, Pending.
U.S. Appl. No. 15/624,897, Pending.
U.S. Appl. No. 15/624,792, Pending.
U.S. Appl. No. 15/626,832, Pending.
U.S. Appl. No. 15/380,336, Pending.
U.S. Appl. No. 15/620,916, Pending.
U.S. Appl. No. 15/626,720, Allowed; QPIDS filed.
U.S. Appl. No. 15/854,439, Pending.
U.S. Appl. No. 15/628,814, Allowed; RCE filed.
U.S. Appl. No. 15/690,400, Pending.
U.S. Appl. No. 15/690,906, Pending.
U.S. Appl. No. 15/626,355, Allowed; RCE filed.
U.S. Appl. No. 15/627,696, Pending.
U.S. Appl. No. 15/854,438, Allowed; QPIDS filed.
U.S. Appl. No. 15/854,409, Allowed; QPIDS filed.
U.S. Appl. No. 15/900,144, Pending.
U.S. Appl. No. 15/920,518, Pending.
U.S. Appl. No. 15/920,768, Allowed; QPIDS filed.
U.S. Appl. No. 16/009,603, Allowed.
U.S. Appl. No. 16/182,083, Pending (Continuation of U.S. Appl. No. 15/920,768).

(56) References Cited

OTHER PUBLICATIONS

U.S. Appl. No. 16/232,165, Pending (Continuation of U.S. Appl. No. 15/854,438).
U.S. Appl. No. 16/100,289, Allowed; RCE filed.
U.S. Appl. No. 15/900,141, Pending.
U.S. Appl. No. 15/920,592, Pending.
U.S. Appl. No. 16/160,377, Pending.
U.S. Appl. No. 16/184,312, Pending.
Office Action dated Jun. 25, 2019 in Japanese Application No. 2015-245144.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Office Action dated Aug. 23, 2019 in U.S. Appl. No. 15/854,409.
Office Action dated Aug. 6, 2019 in Japanese Application No. 2016-254421.
Office Action dated Aug. 6, 2019 in Japanese Application No. 2016-254427.
Office Action dated Jul. 16, 2019 in Japanese Application No. 2016-124933.
Office Action dated Dec. 17, 2019 in Japanese Application No. 2017-029507.
Office Action dated Dec. 17, 2019 in Japanese Application No. 2016-254432.
Office Action dated Aug. 27, 2019 in Japanese Application No. 2016-254428.
Office Action dated Aug. 27, 2019 in Japanese Application No. 2016-254430.
Office Action dated Aug. 27, 2019 in Japanese Application No. 2016-254432.
Office Action dated Sep. 16, 2019 in U.S. Appl. No. 15/854,403.
Office Action dated Sep. 3, 2019 in Japanese Application No. 2016-254434.
Office Action dated Sep. 19, 2019 in U.S. Appl. No. 15/443,026.
Office Action dated Sep. 17, 2019 in Japanese Application No. 2017-029499.
Office Action dated Oct. 12, 2018 in U.S. Appl. No. 15/854,397.
Office Action dated Mar. 5, 2019 in U.S. Appl. No. 15/854,397.
Office Action dated Aug. 28, 2019 in U.S. Appl. No. 15/854,397.
Notice of Allowance dated Mar. 14, 2018 in U.S. Appl. No. 15/854,329.
U.S. Appl. No. 15/280,195, Allowed.
U.S. Appl. No. 15/422,821, Allowed; QPIDS filed.
U.S. Appl. No. 15/619,012, Allowed.
U.S. Appl. No. 15/624,897, Allowed.
U.S. Appl. No. 15/624,792, Allowed.
U.S. Appl. No. 15/626,832, Allowed.
U.S. Appl. No. 15/380,336, Allowed.
U.S. Appl. No. 15/614,876, Allowed.
U.S. Appl. No. 15/620,916, Allowed.
U.S. Appl. No. 15/621,464, Allowed.
U.S. Appl. No. 15/854,383, Allowed.
U.S. Appl. No. 15/854,439, Allowed.
U.S. Appl. No. 15/628,814, Allowed.
U.S. Appl. No. 15/690,400, Allowed.
U.S. Appl. No. 15/690,906, Allowed.
U.S. Appl. No. 15/626,355, Allowed.
U.S. Appl. No. 15/627,696, Allowed.
U.S. Appl. No. 15/388,911, Pending.
U.S. Appl. No. 15/854,403, Pending.
U.S. Appl. No. 15/854,409, Pending
U.S. Appl. No. 15/920,563, Allowed; QPIDS filed.
U.S. Appl. No. 15/920,533, Pending.
U.S. Appl. No. 15/900,144, Allowed.
U.S. Appl. No. 15/900,080, Allowed.
U.S. Appl. No. 15/900,230, Allowed.
U.S. Appl. No. 15/900,164, Allowed.
U.S. Appl. No. 15/920,518, Allowed.
U.S. Appl. No. 15/899,587, Pending.
U.S. Appl. No. 16/182,083, Allowed (Continuation of U.S. Appl. No. 15/920,768).
U.S. Appl. No. 15/705,531, Pending.
U.S. Appl. No. 16/232,165, Allowed (Continuation of U.S. Appl. No. 15/854,438).
U.S. Appl. No. 16/100,289, Allowed.
U.S. Appl. No. 15/900,106, Allowed.
U.S. Appl. No. 15/900,141, Allowed; RCE filed.
U.S. Appl. No. 15/900,160, Allowed.
U.S. Appl. No. 15/900,345, Allowed; QPIDS filed.
U.S. Appl. No. 15/900,379, Allowed; QPIDS filed.
U.S. Appl. No. 15/920,616, Allowed.
U.S. Appl. No. 15/900,242, Allowed.
U.S. Appl. No. 15/900,334, Allowed.
U.S. Appl. No. 16/160,377, Allowed.
U.S. Appl. No. 16/037,564, Pending.
U.S. Appl. No. 16/044,574, Allowed.
U.S. Appl. No. 16/184,312, Allowed.
U.S. Appl. No. 16/143,646, Allowed.
U.S. Appl. No. 16/440,161, Pending.
U.S. Appl. No. 15/854,397, Pending.
U.S. Appl. No. 15/052,115, U.S. Pat. No. 9,704,527.
U.S. Appl. No. 15/218,190, U.S. Pat. No. 9,721,606.
U.S. Appl. No. 15/280,195, U.S. Pat. No. 10,540,996.
U.S. Appl. No. 15/422,821, U.S. Pat. No. 10,475,481.
U.S. Appl. No. 15/422,944, U.S. Pat. No. 10,347,279.
U.S. Appl. No. 15/466,143, U.S. Pat. No. 9,837,116.
U.S. Appl. No. 15/619,012, U.S. Pat. No. 10,515,660.
U.S. Appl. No. 15/624,897, U.S. Pat. No. 10,510,368.
U.S. Appl. No. 15/624,792, U.S. Pat. No. 10,497,388.
U.S. Appl. No. 15/626,832, U.S. Pat. No. 10,510,370.
U.S. Appl. No. 15/625,428, U.S. Pat. No. 10,403,318.
U.S. Appl. No. 14/978,834, U.S. Pat. No. 9,721,605.
U.S. Appl. No. 14/757,555, U.S. Pat. No. 9,711,174.
U.S. Appl. No. 15/197,046, U.S. Pat. No. 9,721,607.
U.S. Appl. No. 15/380,336, U.S. Pat. No. 10,522,180.
U.S. Appl. No. 15/614,876, U.S. Pat. No. 10,431,248.
U.S. Appl. No. 15/620,916, U.S. Pat. No. 10,477,072.
U.S. Appl. No. 15/621,464, U.S. Pat. No. 10,431,249.
U.S. Appl. No. 15/626,720, U.S. Pat. No. 10,347,280.
U.S. Appl. No. 15/854,383, U.S. Pat. No. 10,438,628.
U.S. Appl. No. 15/854,507, U.S. Pat. No. 9,984,716.
U.S. Appl. No. 15/854,439, U.S. Pat. No. 10,482,915.
U.S. Appl. No. 15/854,506, U.S. Pat. No. 10,008,230.
U.S. Appl. No. 15/848,173, U.S. Pat. No. 10,403,320.
U.S. Appl. No. 15/628,814, U.S. Pat. No. 10,504,546.
U.S. Appl. No. 15/690,400, U.S. Pat. No. 10,529,368.
U.S. Appl. No. 15/690,906, U.S. Pat. No. 10,522,179.
U.S. Appl. No. 15/626,355, U.S. Pat. No. 10,510,369.
U.S. Appl. No. 15/627,696, U.S. Pat. No. 10,522,171.
U.S. Appl. No. 14/870,618, U.S. Pat. No. 9,959,894.
U.S. Appl. No. 15/388,911, U.S. Pat. No. 10,573,341.
U.S. Appl. No. 14/753,227, U.S. Pat. No. 9,601,146.
U.S. Appl. No. 15/380,309, U.S. Pat. No. 10,403,319.
U.S. Appl. No. 15/388,864, U.S. Pat. No. 9,773,519.
U.S. Appl. No. 15/072,550, U.S. Pat. No. 9,704,525.
U.S. Appl. No. 15/615,871, U.S. Pat. No. 10,074,393.
U.S. Appl. No. 15/854,410, U.S. Pat. No. 9,972,351.
U.S. Appl. No. 15/378,907, U.S. Pat. No. 9,984,710.
U.S. Appl. No. 15/241,631, U.S. Pat. No. 10,026,435.
U.S. Appl. No. 14/209,065, U.S. Pat. No. 9,530,444.
U.S. Appl. No. 15/854,474, U.S. Pat. No. 9,978,414.
U.S. Appl. No. 15/854,403, Abandoned.
U.S. Appl. No. 15/241,297, U.S. Pat. No. 10,026,434.
U.S. Appl. No. 15/241,286, U.S. Pat. No. 10,026,433[1].
U.S. Appl. No. 15/464,991, U.S. Pat. No. 9,779,772.
U.S. Appl. No. 14/867,752, U.S. Pat. No. 10,026,430.
U.S. Appl. No. 15/854,438, U.S. Pat. No. 10,373,633.
U.S. Appl. No. 15/854,409, Abandoned.
U.S. Appl. No. 15/443,026, Pending.

(56) References Cited

OTHER PUBLICATIONS

U.S. Appl. No. 15/920,782, U.S. Pat. No. 10,134,433.
U.S. Appl. No. 15/920,563, U.S. Pat. No. 10,360,937.
U.S. Appl. No. 15/920,533, U.S. Pat. No. 10,431,251.
U.S. Appl. No. 15/900,144, U.S. Pat. No. 10,497,384.
U.S. Appl. No. 15/900,080, U.S. Pat. No. 10,460,756.
U.S. Appl. No. 15/900,230, U.S. Pat. No. 10,431,250.
U.S. Appl. No. 15/900,164, U.S. Appl. No. 10,424,330.
U.S. Appl. No. 15/920,518, U.S. Appl. No. 10,546,605.
U.S. Appl. No. 15/899,587, U.S. Pat. No. 10,546,602.
U.S. Appl. No. 15/899,430, U.S. Pat. No. 10,403,314.
U.S. Appl. No. 15/920,515, U.S. Pat No. 10,410,665.
U.S. Appl. No. 15/920,517, U.S. Pat. No. 10,395,685.
U.S. Appl. No. 15/920,538, U.S. Pat. No. 10,403,317.
U.S. Appl. No. 15/920,544, U.S. Pat. No. 10,410,666.
U.S. Appl. No. 15/920,768, U.S. Pat. No. 10,373,639.
U.S. Appl. No. 16/009,603, U.S. Pat. No. 10,366,721.
U.S. Appl. No. 16/182,083, U.S. Pat. No. 10,515,661.
U.S. Appl. No. 15/705,531, Allowed.
U.S. Appl. No. 16/232,165, U.S. Pat. No. 10,510,366.
U.S. Appl. No. 16/100,289, U.S. Pat. No. 10,497,389.
U.S. Appl. No. 16/038,669, Pending.
U.S. Appl. No. 15/900,106, U.S. Pat. No. 10,438,624.
U.S. Appl. No. 15/900,412, U.S. Pat. No. 10,062,403[2].
U.S. Appl. No. 15/900,141, U.S. Pat No. 10,573,338.
U.S. Appl. No. 15/900,160, U.S. Pat. No. 10,438,625.
U.S. Appl. No. 15/900,345, U.S. Pat. No. 10,482,913.
U.S. Appl. No. 15/900,379, U.S. Pat. No. 10,453,488.
U.S. Appl. No. 16/012,018, Pending.
U.S. Appl. No. 15/920,616, U.S. Pat. No. 10,438,623.
U.S. Appl. No. 15/900,242, U.S. Pat. No. 10,475,480.
U.S. Appl. No. 15/900,334, U.S. Pat. No. 10,438,621.
U.S. Appl. No. 15/920,592, U.S. Pat. No. 10,403,312.
U.S. Appl. No. 15/920,635, U.S. Pat. No. 10,170,144.
U.S. Appl. No. 16/160,377, U.S. Pat. No. 10,490,220.
U.S. Appl. No. 15/443,094, Pending.
U.S. Appl. No. 15/442,961 (the present Application), Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Allowed.
U.S. Appl. No. 16/038,339, U.S. Pat. No. 10,403,316.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, U.S. Pat. No. 10,438,622.
U.S. Appl. No. 16/142,560, Pending.
U.S. Appl. No. 16/184,312, U.S. Pat. No. 10,497,386.
U.S. Appl. No. 16/143,646, U.S. Pat. No. 10,515,657.
U.S. Appl. No. 16/144,428, Pending.
U.S. Appl. No. 16/143,747, Pending.
U.S. Appl. No. 16/440,161, Allowed.
U.S. Appl. No. 16/144,605, Pending.
U.S. Appl. No. 15/854,397, Abandoned.
U.S. Appl. No. 15/854,329, U.S. Pat. No. 9,984,712.
U.S. Appl. No. 14/838,663, Abandoned.
Notice of Allowance dated May 7, 2020 in U.S. Appl. No. 16/038,514.
Office Action dated Apr. 29, 2020 in U.S. Appl. No. 16/012,018.
Notice of Allowance dated Feb. 20, 2020 in U.S. Appl. No. 15/705,531.
Notice of Allowance dated Feb. 7, 2020 in U.S. Appl. No. 16/440,161.
Office Action dated Feb. 21, 2020 in U.S. Appl. No. 16/038,514.
Office Action dated Mar. 10, 2020 in U.S. Appl. No. 16/037,573.
Office Action dated Mar. 10, 2020 in U.S. Appl. No. 16/037,596.
Office Action dated Mar. 10, 2020 in U.S. Appl. No. 16/037,681.
Office Action dated Mar. 10, 2020 in U.S. Appl. No. 16/038,545.
Office Action dated Mar. 10, 2020 in U.S. Appl. No. 16/038,687.
Office Action dated Mar. 10, 2020 in U.S. Appl. No. 16/038,771.
Office Action dated Mar. 10, 2020 in U.S. Appl. No. 16/038,847.
Office Action dated Mar. 10, 2020 in U.S. Appl. No. 16/038,884.
Office Action dated Mar. 10, 2020 in U.S. Appl. No. 16/142,560.
Office Action dated Mar. 10, 2020 in U.S. Appl. No. 16/143,747.
Office Action dated Mar. 10, 2020 in U.S. Appl. No. 16/144,428.
Office Action dated Mar. 13, 2020 in U.S. Appl. No. 16/038,669.
Office Action dated Mar. 13, 2020 in U.S. Appl. No. 16/144,605.
Notice of Allowance dated Mar. 18, 2020 in U.S. Appl. No. 16/037,564.
Office Action dated Mar. 31, 2020 in U.S. Appl. No. 15/443,026.
Office Action dated Apr. 1, 2020 in U.S. Appl. No. 15/443,094.
Advisory Action dated Jan. 17, 2020 in U.S. Appl. No. 15/443,094.
Notice of Allowance dated Aug. 17, 2020 in U.S. Appl. No. 15/443,026.
Notice of Allowance dated Aug. 3, 2020 in U.S. Appl. No. 16/038,847.
Notice of Allowance dated Aug. 3, 2020 in U.S. Appl. No. 16/038,884.
Notice of Allowance dated Jul. 23, 2020 in U.S. Appl. No. 16/037,573.
Notice of Allowance dated Jul. 23, 2020 in U.S. Appl. No. 16/038,669.
Notice of Allowance dated Jul. 24, 2020 in U.S. Appl. No. 16/037,596.
Notice of Allowance dated Jul. 27, 2020 in U.S. Appl. No. 16/038,771.
Notice of Allowance dated Jul. 29, 2020 in U.S. Appl. No. 16/037,681.
Notice of Allowance dated Jul. 29, 2020 in U.S. Appl. No. 16/142,560.
Notice of Allowance dated Jul. 29, 2020 in U.S. Appl. No. 16/144,428.
Notice of Allowance dated Jul. 29, 2020 in U.S. Appl. No. 16/144,605.
Notice of Allowance dated Jul. 30, 2020 in U.S. Appl. No. 16/038,545.
Notice of Allowance dated Jul. 30, 2020 in U.S. Appl. No. 16/038,687.
Notice of Allowance dated Sep. 17, 2020 in U.S. Appl. No. 16/012,018.
Office Action dated Aug. 25, 2020 in Chinese Application No. 201711439496.2.
Notice of Allowance dated Sep. 23, 2020 in U.S. Appl. No. 15/443,094.
Notice of Allowance dated Dec. 31, 2020 in U.S. Appl. No. 16/143,747.

* cited by examiner

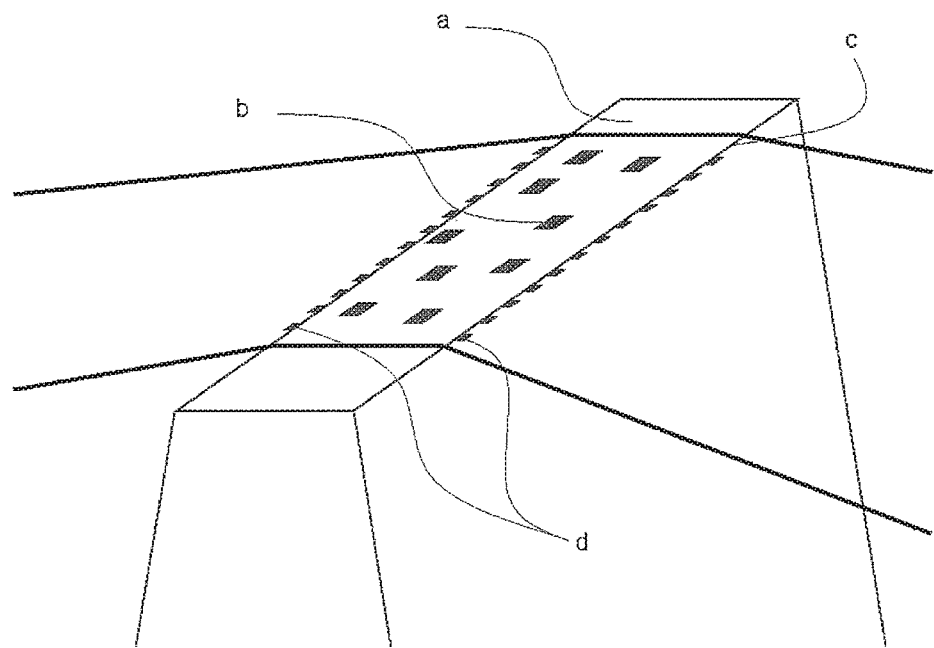

MAGNETIC TAPE

CROSS-REFERENCE TO RELATED APPLICATIONS

This application claims priority under 35 U.S.C 119 to Japanese Patent Application No. 2016-037564 filed on Feb. 28, 2016. The above application is hereby expressly incorporated by reference, in its entirety.

BACKGROUND OF THE INVENTION

Field of the Invention
The present invention relates to a magnetic tape.
Discussion of the Background
Magnetic recording media include tape-shaped media and disk-shaped media. Magnetic recording media in the form of tapes, that is, magnetic tapes, are primarily employed in data storage applications such as data backup.

In a magnetic tape, the providing of a backcoat layer on the opposite surface of a nonmagnetic support from the surface on which a magnetic layer is present has been a widespread practice in recent years (for example, see Japanese Unexamined Patent Publication (KOKAI) No. 2009-283082, which is expressly incorporated herein by reference in its entirety).

SUMMARY OF THE INVENTION

A magnetic tape can be housed wound up on a reel within a magnetic tape cartridge. The recording and reproduction of a signal on a magnetic tape are normally conducted by loading a magnetic tape cartridge into a drive and running the magnetic tape within the drive to bring the surface of the magnetic layer of the magnetic tape into sliding contact with a magnetic head (also referred to hereinafter simply as a "head"). To increase the recording capacity per magnetic tape cartridge, it is better to increase the overall length of the magnetic tape that is housed per cartridge. To that end, it is desirable to reduce the thickness (also referred to as "thickness reduction" hereinafter) of the magnetic tape.

One way of thickness reduction of a magnetic tape is to reduce the thickness of the backcoat layer. As regards the thickness of the backcoat layer, a backcoat layer that is 0.5 μm in thickness is formed in Examples in Japanese Unexamined Patent Publication (KOKAI) No. 2009-283082. However, to achieve the even higher recording capacities that have been demanded in recent years, it is desirable to further reduce the thickness of the backcoat layer (referred to as "thickness reduction" hereinafter).

The data that are recorded on magnetic recording media such as magnetic tapes are referred to as hot data, warm data, and cold data based on frequency of access (reproduction frequency). The access frequency decreases in the order of hot data, warm data, and cold data. Cold data are normally data that are stored as recorded on a magnetic medium for an extended period of greater than or equal to 10 years (for example, several decades). A recording medium for recording and storing such cold data is referred to as an archive recording medium. With the increase by leaps and bounds in the amount of information and the digitization of various information in recent years, the quantity of cold data being recorded and stored on archive recording media has also increased, resulting in ever higher demand for archive recording media.

Given the above situation, the present inventors have examined the application of a magnetic tape having a backcoat layer on the surface on the opposite side of the nonmagnetic support from that on which the magnetic layer is formed, with the thickness of the backcoat layer having been reduced relative to the backcoat layer formed in Examples of Japanese Unexamined Patent Application No. 2009-0283082. However, a magnetic tape the thickness of the backcoat layer of which had been reduced to less than or equal to 0.20 μm was found to form head deposits with repeated running following an acceleration test equivalent to data storage (long-term storage) on an archive magnetic medium. These head deposits were primarily found on the head on the surface coming into contact with the surface of the magnetic layer (described as the "head surface" hereinafter) in the course of the surface of the magnetic layer of the magnetic tape sliding against the head. The generation of these head deposits was attributed to the transfer of foreign material from the surface of the magnetic layer to the head. Deposits that adhere to the head surface will be referred to as "head surface deposits." When the surface of the magnetic layer slides repeatedly against a head to which head surface deposits have adhered, the gap (spacing) between the surface of the magnetic layer and the head is affected and output may fluctuate. Such output fluctuation is called spacing loss, and with repeated sliding of the surface of the magnetic layer against the head, sometimes causes a drop in electromagnetic characteristics. Accordingly, the generation of head surface deposits is desirably inhibited.

An aspect of the present invention provides for a magnetic tape having a backcoat layer the thickness of which has been reduced to less than or equal to 0.20 μm, in which the generation of head surface deposits with repeated running following long-term storage has been inhibited, and that is suited to use as an archive recording medium.

An aspect of the present invention relates to:
a magnetic tape having a magnetic layer containing ferromagnetic powder and binder on one surface of a nonmagnetic support and having a backcoat layer containing nonmagnetic powder and binder on the other surface thereof, wherein:

the thickness of the backcoat layer is less than or equal to 0.20 μm;

the contact angle for 1-bromonaphthalene that is measured on the surface of the backcoat layer falls within a range of 10.0° to 30.0°; and the contact angle for 1-bromonaphthalene that is measured on the surface of the magnetic layer falls within a range of 45.0° to 55.0°.

The above magnetic tape, despite having a backcoat layer the thickness of which has been reduced to less than or equal to 0.20 μm, can inhibit the generation of head surface deposits with repeated running following long-term storage equivalent to data storage on an archive magnetic medium. Presumptions by the present inventors in this regard are set forth further below.

The "contact angle for 1-bromonaphthalene" is also referred to as the "1-bromonaphthalene contact angle" below. The "contact angle for water" referred to further below is also referred to as the "water contact angle." The 1-bromonaphthalene contact angle and the water contact angle are evaluated by the drop method. Specifically, the "contact angle" refers to the arithmetic average of values obtained by conducting six measurements of a given sample by the θ/2 method in a measurement environment of an atmospheric temperature of 25° C. and 25% relative humidity. Examples of specific measurement conditions will be set forth further below in Examples. In the present invention and the present specification, the terms "1-bromonaphthalene contact angle" and "water contact angle" are values that are measured in a magnetic tape that has not been subjected to long-term storage equivalent to the data storage of an archive recording medium or to acceleration testing equivalent to such long-term storage. In the present invention and present specification, the "surface of the magnetic layer" of the magnetic tape is synonymous with the surface of the magnetic tape on the magnetic layer side. The "surface of the backcoat layer" of the magnetic tape is synonymous with the surface of the magnetic tape on the backcoat layer side.

In one embodiment, the thickness of the backcoat layer falls within a range of 0.05 µm to 0.20 µm.

In one embodiment, either one of, or both, the backcoat layer and the magnetic layer further contain a nitrogen-containing polymer. In the present invention and the present specification, the term "polymer" is used to mean a polymer comprised of multiple repeating units that are identical or different, including homopolymers and copolymers.

In one embodiment, the above nitrogen-containing polymer is a polyalkyleneimine polymer.

In one embodiment, the above polyalkyleneimine polymer is a polymer containing a polyalkyleneimine chain and a polyester chain.

In one embodiment, either one of, or both, the backcoat layer and the magnetic layer further contain one or more lubricants selected from the group consisting of fatty acids, fatty acid esters, and fatty acid amides.

In one embodiment, the contact angle for water that is measured on the surface of the magnetic layer falls within a range of 90.0° to 100.0°.

In one embodiment, the nonmagnetic powder contained in the backcoat layer is selected from the group of inorganic powder and carbon black. The term "inorganic powder" means a collection of a plurality of nonmagnetic particles. The term "collection" is not limited to forms in which the constituent particles are in direct contact, but also includes forms where binder and/or additives and the like are present between the particles. The term "particles" will also sometimes be used to denote powder. The same applies to the various powders in the present invention and the present specification.

In one embodiment, the nonmagnetic powder contained in the backcoat layer contains at least carbon black.

In one embodiment, a nonmagnetic layer containing nonmagnetic powder and binder is further present between the nonmagnetic support and the magnetic layer in the above magnetic tape.

An aspect of the present invention can provide a magnetic tape, having a backcoat layer the thickness of which has been reduced to less than or equal to 0.20 µm, in which the generation of head surface deposits with repeated running following long-term storage has been inhibited, and that is suitable for use as an archive recording medium.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein:

FIG. 1 is a descriptive drawing of the method of evaluating head deposits (head surface deposits, head edge deposits) Examples.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

The magnetic tape of an aspect of the present invention is a magnetic tape that has a magnetic layer containing ferromagnetic powder and binder on one surface of a nonmagnetic support and has a backcoat layer containing nonmagnetic powder and binder on the other surface thereof, in which the thickness of the backcoat layer is less than or equal to 0.20 µm, in which the contact angle for 1-bromonaphthalene that is measured on the surface of the backcoat layer falls within a range of 10.0° and 30.00, and in which the contact angle for 1-bromonaphthalene that is measured on the surface of the magnetic layer falls within a range of 45.0° to 55.00.

Although in no way limiting the present invention, the reasons for which the present inventors presume that the generation of head surface deposits with repeated running following long-term storage equivalent to long-term data storage on an archive recording medium can be inhibited in the above magnetic tape despite having a backcoat layer the thickness of which has been reduced to less than or equal to 0.20 µm are given below.

The present inventors focused on the contact angle for 1-bromonaphthalene (1-bromonaphthalene contact angle) in extensive research. This will be described further.

The present inventors presumed that by achieving a suitable degree of affinity between the surface of the magnetic layer and the head, it might be possible to reduce the head surface deposits generated with repeated running. They also thought that the surface free energy of the surface of the magnetic layer affected the affinity between the surface of the magnetic layer and the head, and conducted research based on the theory of Kitazaki-Hata (three-liquid method), which is a known theory relating to surface free energy. The surface free energy calculated by the three-liquid method is obtained as the sum of a dispersion component, hydrogen-bonding component, and polar component. However, the dispersion component due to the physical properties of the constituent components of the magnetic tape is thought to be dominant in the surface free energy that is measured on the surface of a particulate magnetic tape such as the above magnetic tape. Accordingly, the dispersion component was presumed to primarily contribute to the affinity of the surface of the magnetic layer of the magnetic tape and the head. Accordingly, the present inventors conducted extensive research into controlling the surface state of the magnetic layer based on the indicator of the dispersion component. As a result, they adopted the 1-bromonaphthalene contact angle. This resulted from focusing on the fact that the dispersion component of 1-bromonaphthalene also dominated the surface free energy. The present inventors then further examined controlling the surface state of the magnetic layer based on the 1-bromonaphthalene contact angle. In this research, the present inventors came to presume the following.

A magnetic tape is normally housed in a state of being wound up on a reel within a magnetic tape cartridge. Information is recorded on the magnetic tape by loading the magnetic tape cartridge into a drive and running the magnetic tape within the magnetic tape cartridge to cause the surface of the magnetic layer of the magnetic tape to come into sliding contact with a head. Following recording in this fashion, a magnetic tape on which cold data have been recorded will normally be stored for an extended period of, for example, greater than or equal to 10 years, in a state of being wound up on a reel. In long-term storage, the surface of the magnetic layer is in a state of contact with the surface of the backcoat layer of a magnetic tape that is wound up on a reel. The storage period is much longer than the period for which data for data backup are normally stored on a recording medium. The present inventors presume that when the surface of the magnetic layer remains in contact with the surface of the backcoat layer with the magnetic tape in a wound up state for such a long period, and the magnetic tape is run in a drive after such a long storage period, in the course of releasing the contact between the surface of the magnetic layer and the surface of the backcoat layer, the magnetic layer components that were present in the magnetic layer prior to the long period of storage may be transferred to the surface of the backcoat layer. They also presume that such a transfer ends up changing the surface state of the magnetic layer relative to its state prior to long-term storage. Accordingly, the present inventors conducted further extensive research based on the presumption that by means of the two points of:

(1) achieving a surface state on the magnetic layer exhibiting suitable affinity with the head; and
(2) inhibiting the occurrence of the above transfer;
it would be possible to inhibit the generation of head surface deposits with repeated running following long-term storage equivalent to data storage on an archive recording medium. In this research, the present inventors presumed that the dispersion component dominated not just the surface free energy of the magnetic layer, but also that of the backcoat layer, and that as a consequence, it was also necessary to control the surface state of the backcoat layer based on the 1-bromonaphthalene contact angle of the backcoat layer in order to inhibit this transfer. As a result, they found that it was possible to inhibit the generation of head surface deposits with repeat running following long-term storage equivalent to data storage on archive recording media with a magnetic tape in which the 1-bromonaphtalane contact angle measured on the surface of the magnetic layer fell within a range of 45.0° to 55.0° and in which the 1-bromonaphthalene contact angle measured on the surface of the backcoat layer fell within a range of 10.0° to 30.0° even in the case of reducing the thickness of the backcoat layer to less than or equal to 0.20 µm. The reason for which head surface deposits tend to occur with repeated running following such long-term storage in a magnetic tape in which the thickness of the backcoat layer is less than or equal to 0.20 µm could be that the contact state of the surface of the backcoat layer and the surface of the magnetic layer in a wound up state differs from that of a magnetic tape having a thicker backcoat layer. However, this is merely a presumption and the reason is unclear.

The present invention was devised based on the above discovery. However, the above includes presumptions by the present inventors and does not limit the present invention in any way.

The above magnetic tape will be described in greater detail below.

[Thickness of the Backcoat Layer]

The thickness of the backcoat layer of the above magnetic tape is less than or equal to 0.20 µm. The thickness of the backcoat layer can be, for example, greater than or equal to 0.05 µm, or greater than or equal to 0.10 µm. Reducing the thickness of the backcoat layer to less than or equal to 0.20 µm can contribute to a reduction in the thickness of the magnetic tape on which the backcoat layer is present. However, reduction in the thickness of the backcoat layer may cause the generation of head surface deposits with repeated running following long-term storage such as has been forth above. By contrast, so long as the 1-bromonaphthalene contact angle on the surface of the magnetic layer and on the surface of the backcoat layer of a magnetic tape having a backcoat layer that is less than or equal to 0.20 µm in thickness fall within the respective ranges set forth above, it is possible both to achieve a reduction in the thickness of the backcoat layer and to inhibit the generation of the above head surface deposits. From the perspective of further reducing the thickness of the magnetic tape, the thickness of the backcoat layer can be less than or equal to 0.18 µm, or less than or equal to 0.15 µm.

[1-Bromonaphthalene Contact Angle]

The 1-bromonaphthalene contact angle that is measured on the surface of the magnetic layer of the above magnetic tape falls within a range of 45.0° to 55.0°. This is thought to contribute to inhibiting the generation of head surface deposits with repeated running following long-term storage such as that set forth above. From the perspective of further inhibiting the above generation of head surface deposits, the 1-bromonaphthalene contact angle that is measured on the surface of the magnetic layer is desirably greater than or equal to 48.0°, preferably greater than or equal to 52.0°.

The 1-bromonaphthalene contact angle that is measured on the surface of the backcoat layer of the above magnetic tape falls within a range of 10.0 to 30.0°. This is also thought to contribute to inhibiting the generation of head surface deposits with repeated running following long-term storage such as that set forth above. The present inventors presume that this might inhibit the transfer described above. However, this is merely a presumption. From the perspective of further inhibiting the generation of the above head surface deposits, the 1-bromonaphthalene contact angle that is measured on the surface of the backcoat layer is desirably less than or equal to 15.0°, preferably less than or equal to 20.0°.

The 1-bromonaphthalene contact angle that is measured on the surface of the magnetic layer can be controlled by employing components capable of adjusting the 1-bromonaphthalene contact angle (also referred to as "1-bromonaphthalene contact angle-adjusting components" or "contact angle-adjusting components", hereinafter) and by adjusting the content of such components. The 1-bromonaphthalene contact angle measured on the surface of the backcoat layer can also be controlled by using 1-bromonaphthalene contact angle-adjusting components and adjusting the content of such components. For example, a component capable of producing an effect that increases the value of the 1-bromonaphthalene contact angle can be employed as a 1-bromonaphthalene contact angle-adjusting component and the content of this component can be increased to increase the value of the 1-bromonaphthalene contact angle.

An example of a 1-bromonaphthalene contact angle-adjusting components is a lubricant. The polymers set forth in detail further below are further examples. For example, the 1-bromonaphthalene contact angle that is measured on the surface of the magnetic layer and on the surface of the backcoat layer can be kept within the above respective ranges by employing one or more 1-bromonaphthalene contact angle-adjusting components selected from the group consisting of lubricants and the polymers described further below. In one embodiment, the magnetic layer and backcoat layer can be formed using one or more lubricants as 1-bromonaphthalene contact angle-adjusting components and not employing any of the polymers described further below. In another embodiment, the magnetic layer and backcoat layer can be formed by employing one or more of the polymers described further below as 1-bromonaphthalene contact angle-adjusting components and not employing a lubricant. In yet another embodiment, the magnetic layer and the backcoat layer can be formed by one or more lubricants and one or more of the polymers described further below in combination as 1-bromonaphthalene contact angle-adjusting components. At least one of the polymers described further below is desirably employed to form the magnetic layer and the backcoat layer. The reason this is desirable is as follows.

Normally, it is not easy to increase the 1-bromonaphthalene contact angle that is measured on the surface of a backcoat layer that is less than or equal to 0.20 μm in thickness to a level that is greater than or equal to a given value by just adding a lubricant. This is thought by the present inventors to be due to the fact that since the quantity of lubricant that can be held in a backcoat layer of reduced thickness is less than that of a thicker backcoat layer, the addition of more than a certain quantity of lubricant ends up in the lubricant precipitating out. Further, the use of just a lubricant in the magnetic layer to control the 1-bromonaphthalene contact angle to within the above range sometimes results in a high lubricant content in the magnetic layer. When the content of lubricant in the magnetic layer increases, lubricant tends to transfer to the head from the surface of the magnetic layer during sliding of the surface of the magnetic layer against the head, and tends to primarily adhere to the edges of the contact surface with the surface of the magnetic layer. The deposits adhering to the edges of the head will be referred to hereinafter as "head edge deposits". Such head edge deposits may also cause spacing loss. Thus, from the perspective of further enhancing electromagnetic characteristics, it is desirable to inhibit the adhesion of lubricants to the head. To this end, as set forth above, at least one of the polymers described further below is desirably used to form the magnetic layer.

[Water Contact Angle]

As regards the above points, based on research by the present inventors, the contact angle with water (water contact angle) that is measured on the surface of the magnetic layer can exhibit a correlation with the content of lubricant of the magnetic layer. The more the lubricant content is increased, the higher the value of the water contact angle that tends to be observed. From the perspective of inhibiting adhesion of lubricant to the head, the water contact angle that is measured on the surface of the magnetic layer is desirably less than or equal to 100.0°, preferably less than or equal to 99.5°, and more preferably, less than or equal to 99.0°. From the perspective of smooth sliding of the surface of the magnetic layer with the head during running, the water contact angle that is measured on the surface of the magnetic layer is desirably greater than or equal to 90.0°, preferably greater than or equal to 93.0°, and more preferably, greater than or equal to 95.0°. The water contact angle can be adjusted by means of the lubricant content.

[1-Bromonaphthalene Contact Angle-Adjusting Component]

The term "1-bromonaphthalene contact angle-adjusting component" refers to a component that is capable of adjusting the 1-bromonaphthalene contact angle that is measured on the surface of the magnetic layer or on the surface of the backcoat layer. Here, the term "capable of adjusting" means exhibiting an effect that changes the 1-bromonaphthalene contact angle. The fact of exhibiting such an effect can be recognized by determining whether the presence of a 1-bromonaphthalene contact angle-adjusting component changes the 1-bromonaphthalene contact angle that is measured on the surface of the magnetic layer or the surface of the backcoat layer. The 1-bromonaphthalene contact angle-adjusting component can desirably exhibit an effect of increasing the value of the 1-bromonaphthalene contact angle. One form of a 1-bromonaphthalene contact angle-adjusting component is a lubricant; other forms are polymers that will be described in detail further below. These components will be sequentially described below.

Examples of the lubricant are various lubricants commonly employed in magnetic recording media, such as fatty acids, fatty acid esters, and fatty acid amides.

Examples of fatty acids are lauric acid, myristic acid, palmitic acid, steric acid, oleic acid, linoleic acid, linolenic acid, behenic acid, erucic acid, and elaidic acid. Stearic acid, myristic acid, and palmitic acid are desirable, and stearic acid is preferred. Fatty acids can also be incorporated into the magnetic layer in the form of salts such as metal salts.

Examples of fatty acid esters are esters of each of the above fatty acids, such as butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

Examples of fatty acid amides are amides of each of the above fatty acids, such as amide laurate, amide myristate, amide palmitate, and amide stearate.

The fatty acid content in the magnetic layer-forming composition is, for example, 0 to 10.0 weight parts, desirably 0.1 to 10.0 weight parts, preferably 0.5 to 8.0 weight parts, and more preferably, 1.0 to 7.0 weight parts, per 100.0 weight parts of ferromagnetic powder. When two or more different fatty acids are employed as the fatty acids, the content refers to the combined content thereof. The same applies to other components. That is, one or more types of a given component can be contained in the present invention and the present specification unless specifically stated otherwise. When two or more types of a given component are contained, the content of the component refers to the combined quantity of the two or more types unless specifically stated otherwise.

The fatty acid ester content is, for example, 0.1 to 10.0 weight parts, desirably 0.5 to 8.0 weight parts, and more preferably, 1.0 to 7.0 weight parts, per 100.0 weight parts of ferromagnetic powder as the fatty acid ester content of the magnetic layer-forming composition.

The fatty acid amide content in the magnetic layer-forming composition is, for example, 0 to 3.0 weight parts, desirably 0 to 2.0 weight parts, and preferably, 0 to 1.0 weight parts, per 100.0 weight parts of ferromagnetic powder.

When a nonmagnetic layer is present between the nonmagnetic support and the magnetic layer in the above magnetic tape, lubricant can be contained, or not contained, in the nonmagnetic layer. At least a portion of the lubricant that is contained in the nonmagnetic layer will normally be capable of migrating to the magnetic layer side and being present in the magnetic layer. The fatty acid content of the nonmagnetic layer-forming composition is, for example, 0 to 10.0 weight parts, desirably 1.0 to 10.0 weight parts, and preferably, 1.0 to 7.0 weight parts, per 100.0 weight parts of nonmagnetic powder. The fatty acid ester content is, for example, 0 to 10.0 weight parts, desirably 0.1 to 8.0 weight parts, per 100.0 weight parts of nonmagnetic powder. The fatty acid amide content in the nonmagnetic layer-forming composition is, for example, 0 to 3.0 weight parts, desirably 0 to 1.0 weight parts, per 100.0 weight parts of nonmagnetic powder.

The fatty acid content of the backcoat layer-forming composition is, for example, 0.1 to 10.0 weight parts, desirably 0.2 to 7.0 weight parts, per 100.0 weight parts of nonmagnetic powder.

The fatty acid ester content of the backcoat layer-forming composition is, for example, 0.1 to 10.0 weight parts, desirably 1.0 to 7.0 weight parts, per 100.0 weight parts of nonmagnetic powder.

The fatty acid amide content of the backcoat layer-forming composition is, for example, 0.1 to 3.0 weight parts, desirably 0.1 to 1.0 weight parts, per 100.0 weight parts of nonmagnetic powder.

It is desirable to employ a fatty acid in combination with one or more fatty acid derivative. It is preferable to employ a fatty acid in combination with one or more selected from the group consisting of fatty acid esters and fatty acid amides. And it is of greater preference to employ a fatty acid in combination with a fatty acid ester and a fatty acid amide.

When employing a fatty acid in combination with a fatty acid derivative (ester, amide, or the like), the fatty acid-derived moiety of the fatty acid derivative desirably has the same structure or one similar to that of the fatty acid with which it is being employed. As an example, when employing stearic acid as a fatty acid, it is desirable to employ a stearic acid ester and/or amide stearate.

The lubricant described in Japanese Unexamined Patent Publication (KOKAI) No. 2009-96798, paragraph 0111 can be employed. The content of the above publication is expressly incorporated herein by reference in its entirety Incorporating a lubricant into the magnetic layer tends to increase the value of the 1-bromonaphthalene contact angle measured on the surface of the magnetic layer. However, as set forth above, from the perspective of inhibiting the adhesion of lubricant to the head, it is desirable to optionally incorporate a 1-bromonaphthalene contact angle-adjusting agent in the form of one of the following polymers into the magnetic layer along with a lubricant. Incorporating a lubricant into the backcoat layer tends to increase the 1-bromonaphthalene contact angle measured on the surface of the backcoat layer. However, as set forth above, just incorporating a lubricant into a backcoat layer less than or equal to 0.20 µm in thickness normally does not readily raise the 1-bromonaphthalene contact angle to or above a given value. Accordingly, it is desirable to optionally incorporate a 1-bromonaphthalene contact angle-adjusting component other than a lubricant into the backcoat layer along with a lubricant. The following polymers are examples of such 1-bromonaphthalene contact angle-adjusting components other than lubricants.

<Nitrogen-Containing Polymer>

An example of one form of a 1-bromonaphthalene content-adjusting component is a nitrogen-containing polymer. The present inventors presume that the polymer chain contained in a nitrogen-containing polymer can contribute to increasing the 1-bromonaphthalene contact angle measured on the surface of the magnetic layer or the surface of the backcoat layer.

The term "nitrogen-containing polymer" refers to a polymer containing nitrogen atoms in the structure thereof. Examples of desirable nitrogen-containing polymers are amine polymers in the form of polyalkyleneimine polymers and amine polymers other than polyalkyleneimine polymers.

In one embodiment, the nitrogen-containing polymer is desirably a polymer the weight average molecular weight of which falls within a range that is not greater than the weight average molecular weight of the binder contained in the magnetic layer and/or the backcoat layer. For example, the weight average molecular weight of the above nitrogen-containing polymer can be less than or equal to 80,000, less than or equal to 60,000, less than or equal to 40,000, less than or equal to 35,000, less than or equal to 30,000, less than or equal to 20,000, or less than or equal to 10,000. Further, the weight average molecular weight can be, for example, greater than or equal to 1,000, greater than or equal to 1,500, greater than or equal to 2,000, or greater than or equal to 3,000. Unless specifically stated otherwise, the term "weight average molecular weight" as referred to in the present invention and present specification is a value measured by gel permeation chromatography (GPC) under the following measurement conditions and converted to a polystyrene equivalent.

GPC value: HLC-8120 (made by Tosoh Corp.)
Column: TSK gel Multipore HXL-M (7.8 mm inner diameter (ID)×30.0 cm, made by Tosoh Corp.)
Eluent: Tetrahydrofuran (THF)

Desirable polyalkyleneimine polymers are described below.

<Polyalkyleneimine Polymer>
(Polyalkyleneimine Chain)

The term "polyalkyleneimine polymer" refers to a polymer containing one or more polyalkyleneimine chains. In one embodiment, it is presumed that the polyalkyleneimine chain can function as a moiety adsorbing to the ferromagnetic powder in the magnetic layer or to the nonmagnetic powder in the backcoat layer. The term "polyalkyleneimine chain" refers to a polymerization structure containing two or more identical or different alkyleneimine chains. Examples of the alkyleneimine chains that are contained are the alkyleneimine chain denoted by formula A below and the alkyleneimine chain denoted by formula B below. Among the alkyleneimine chains denoted by the formulas given below, the alkyleneimine chain denoted by formula A can contain a bond position with another polymer chain. The alkyleneimine chain denoted by formula B can be bonded by means of a salt crosslinking group (described in greater detail further below) to another polymer chain. The polyalkyleneimine chain can have only a linear structure, or can have a branched tertiary amine structure. Examples comprising branched structures are ones where the alkyleneimine chain is bonded to an adjacent alkyleneimine chain at *$^1$ in formula A below and where it is bonded to the adjacent alkyleneimine chain at *$^2$ in formula B below.

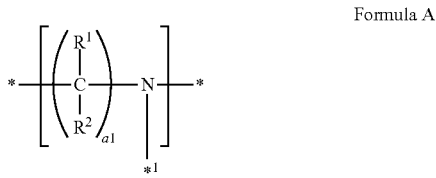

Formula A

In formula A, each of $R^1$ and $R^2$ independently denotes a hydrogen atom or an alkyl group; a1 denotes an integer of equal to or greater than 2; and *$^1$ denotes the site of a bond with an adjacent another polymer chain (such as a polyester chain, an adjacent alkyleneimine chain set forth below), or a hydrogen atom or a substituent.

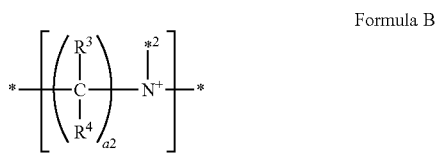

Formula B

In formula B, each of $R^3$ and $R^4$ independently denotes a hydrogen atom or an alkyl group, and a2 denotes an integer of equal to or greater than 2. The alkyleneimine chain denoted by formula B bonds to another polymer chain having an anionic group by $N^+$ in formula B and the anionic group contained in another polymer chain forming a salt crosslinking group.

The * in formulas A and B, and the *$^2$ in formula B, each independently denotes the position of a bond with an adjacent alkyleneimine chain, a hydrogen atom or a substituent.

Formulas A and B will be described in greater detail below. In the present invention and the present specification, unless specifically stated otherwise, the groups that are described can be substituted or unsubstituted. When a given group contains substituent(s), examples of the substituent are alkyl groups (such as alkyl groups having 1 to 6 carbon atoms), hydroxyl groups, alkoxy groups (such as alkoxy groups having 1 to 6 carbon atoms), halogen atoms (such as fluorine atoms, chlorine atoms, and bromine atoms), cyano groups, amino groups, nitro groups, acyl groups, and carboxyl groups. For a group having a substituent, the "number of carbon atoms" means the number of carbon atoms of the portion not containing the substituent.

Each of $R^1$ and $R^2$ in formula A, and each of $R^3$ and $R^4$ in formula B, independently denotes a hydrogen atom or an alkyl group. Examples of the alkyl groups are alkyl groups having 1 to 6 carbon atoms, desirably alkyl groups having 1 to 3 carbon atoms, preferably methyl or ethyl groups, and more preferably, methyl groups. Combinations of $R^1$ and $R^2$ in formula A include an embodiment where one denotes a hydrogen atom and the other denotes an alkyl group, an embodiment where both denote alkyl groups (identical or different alkyl groups), and desirably, an embodiment where both denote hydrogen atoms. The above matters are also applied to $R^3$ and $R^4$ in formula B.

The structure with the fewest carbon atoms constituting the ring in an alkyleneimine is ethyleneimine. The number of carbon atoms on the main chain of the alkyleneimine chain (ethyleneimine chain) obtained by opening the ring of ethyleneimine is 2. Accordingly, the lower limit of a1 in formula A and of a2 in formula B is 2. That is, each of a1 in formula A and a2 in formula B independently denotes an integer of equal to or greater than 2. Each of a1 in formula A and a2 in formula B can be independently, for example, equal to or less than 10, desirably equal to or less than 6, preferably equal to or less than 4, more preferably 2 or 3, and still more preferably, 2.

The bond between the alkyleneimine chain denoted by formula A and the alkyleneimine chain denoted by formula B and another polymer chain will be described further below.

Each of the alkyleneimine chains set forth above bonds to an adjacent alkyleneimine chain, a hydrogen atom, or a substituent at the positions denoted by * in the various formulas above. An example of a substituent is a monovalent substituent such as an alkyl group (such as an alkyl group with 1 to 6 carbon atoms), but this is not a limitation. Another polymer chain (such as a polyester chain set forth below) can also be bonded as a substituent.

The number average molecular weight of the polyalkyleneimine chain contained in the polyalkyleneimine polymer is desirably equal to or higher than 300, and preferably equal to or higher than 500. It is desirably equal to or lower than 3,000, and preferably equal to or lower than 2,000. The number average molecular weight of the polyalkyleneimine chain contained in the polyalkyleneimine polymer refers to a value obtained as described in paragraph 0027 of Japanese Unexamined Patent Publication (KOKAI) No. 2015-28830, which is expressly incorporated herein by reference in its entirety.

From the perspective of facilitating control of the 1-bromonaphthalene contact angle, the proportion accounted for by polyalkyleneimine chains in the polyalkyleneimine polymer (also referred to as the "polyalkyleneimine chain ratio", hereinafter) is desirably less than 5.0 weight percent, preferably less than or equal to 4.9 weight percent, more preferably less than or equal to 4.8 weight percent, still more preferably less than or equal to 4.5 weight percent, yet more preferably less than or equal to 4.0 weight percent, and even more preferably, less than or equal to 3.0 weight percent. From the same perspective, the polyalkyleneimine chain ratio is desirably greater than or equal to 0.2 weight percent, preferably greater than or equal to 0.3 weight percent, and more preferably, greater than or equal to 0.5 weight percent.

The above proportion accounted for by polyalkyleneimine chains can be controlled, for example, by means of the mixing ratio of polyalkyleneimine and polyester employed during synthesis.

The proportion in the polyalkyleneimine polymer accounted for by the polyalkyleneimine chain can be calculated from the results of analysis by nuclear magnetic resonance (NMR)—more specifically, $^1$H-NMR and $^{13}$C-NMR—and by elemental analysis by known methods. Since the value thus calculated is identical to or similar to the theoretical value obtained from the compounding ratio of the synthesis starting materials of the polyalkyleneimine polymer, the theoretical value obtained from the compounding ratio can be adopted as the proportion in the polyalkyleneimine polymer accounted for by the polyalkyleneimine chain (polyalkyleneimine chain ratio).

(Polyester Chain)

In addition to the polyalkyleneimine chain set forth above, the polyalkyleneimine polymer desirably contains another polymer chain(s). A desirable example of another polymer chain is a hydrophobic chain. The hydrophobic chain is desirably a polyester chain. In one embodiment, the alkyleneimine chain denoted by formula A and a polyester chain can form —N—(C=O)— by bonding of the nitrogen atom N in formula A to a carbonyl group —(C=O)— at *¹ in formula A. In another embodiment, the alkyleneimine chain denoted by formula B and a polyester chain can form a salt crosslinking group by means of the nitrogen cation $N^+$ in formula B and the anionic group present in a polyester chain. An example of a salt crosslinking group is one formed from the oxygen anion $O^-$ contained in a polyester chain and the $N^+$ contained in formula B. However, this is not intended as a limitation.

The polyester chain denoted by formula 1 below is an example of a polyester chain bonding to the nitrogen atom N contained in formula A by means of a carbonyl bond —(C=O)— to the alkyleneimine chain denoted by formula A. The polyester chain denoted by formula 1 below can bond to the alkyleneimine chain denoted by formula A at the bond position denoted by *¹ by the formation of —N—(C=O)— by the nitrogen atom contained in the alkyleneimine chain and the carbonyl group —(C=O)— contained in the polyester chain.

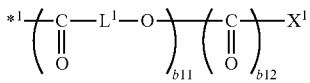

Formula 1

The polyester chain denoted by formula 2 below is an example of a polyester chain that can bond to the alkyleneimine chain denoted by formula B by means of the $N^+$ in formula B and an anionic group contained in the polyester chain forming a salt crosslinking group. In the polyester chain denoted by formula 2 below, the oxygen anion $O^-$ and the $N^+$ in formula B can form a salt crosslinking group.

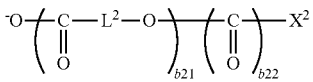

Formula 2

Each of $L^1$ in formula 1 and $L^2$ in formula 2 independently denotes a divalent linking group. A desirable example of a divalent linking group is an alkylene group having 3 to 30 carbon atoms. As set forth above, the number of carbon atoms in an alkylene group refers to the portion (main chain portion) excluding the substituent when the alkylene group contains a substituent.

Each of b11 in formula 1 and b21 in formula 2 independently denotes an integer of equal to or greater than 2; for example, an integer of equal to or less than 200. The number of repeating lactone units given in Examples further below corresponds to b11 in formula 1 or b21 in formula 2.

Each of b12 in formula 1 and b22 in formula 2 independently denotes 0 or 1.

Each of $X^1$ in formula 1 and $X^2$ in formula 2 independently denotes a hydrogen atom or a monovalent substituent. Examples of monovalent substituents are monovalent substituents selected from the group consisting of alkyl groups, haloalkyl groups (such as fluoroalkyl groups), alkoxy groups, polyalkyleneoxyalkyl groups, and aryl groups.

The alkyl group may be substituted or unsubstituted. An alkyl group substituted with at least one hydroxyl group (a hydroxyalkyl group) and an alkyl group substituted with at least one halogen atom are desirable as a substituted alkyl group. An alkyl group in which all the hydrogen atoms bonded to carbon atoms have been substituted with halogen atoms (a haloalkyl group) is also desirable. Examples of halogen atoms include fluorine, chlorine and bromine atoms. An alkyl group having 1 to 30 carbon atoms is preferred, and an alkyl group having 1 to 10 carbon atoms is of greater preference. The alkyl group can be linear, have a branched chain, or be cyclic. The same applies to a haloalkyl group.

With regard to specific examples of substituted or unsubstituted alkyl group and haloalkyl group, reference can be made to paragraph 0052 of Japanese Unexamined Patent Publication (KOKAI) No. 2015-28830. Reference can be made to paragraph 0053 of Japanese Unexamined Patent Publication (KOKAI) No. 2015-28830 with regard to specific examples of alkoxy groups.

Polyalkyleneoxyalkyl groups are monovalent substituents denoted by $R^{10}(OR^{11})n(O)m-$. $R^{10}$ denotes an alkyl group, $R^{11}$ denotes an alkylene group, n denotes an integer of equal to or greater than 2, and m denotes 0 or 1.

The alkyl group denoted by $R^{10}$ is as described for the alkyl groups denoted by $X^1$ and $X^2$. The details of the alkylene group denoted by $R^{11}$ are as follows. The above description of the alkyl groups denoted by $X^1$ and $X^2$ can be applied to these alkylene groups by reading alkylenes with one fewer hydrogen atom for the former (for example, by reading "methylene group" for "methyl group"). n denotes an integer of equal to or greater than 2; for example, an integer of equal to or less than 10, desirably equal to or less than 5.

The aryl group can be substituted and can be a condensed ring. It is preferably an aryl group with 6 to 24 carbon atoms, such as a phenyl group, a 4-methylphenyl group, 4-phenylbenzoic acid, a 3-cyanophenyl group, a 2-chlorophenyl group, or a 2-naphthyl group.

The polyester chains denoted by formulas 1 and 2 above can be structures derived from polyesters obtained by known polyester synthesis methods. Lactone ring-opening polymerization is an example of a polyester synthesis method. Examples of lactones are those described in paragraph 0056 of Japanese Unexamined Patent Publication (KOKAI) No. 2015-28830. γ-caprolactone, lactides, and δ-valerolactone are desirable as lactones from the perspectives of reactivity and/or availability. However, there is no limitation thereto. Any lactone yielding polyester by means of ring-opening polymerization will do.

With regard to nucleophilic reagents in lactone ring-opening polymerization, reference can be made to paragraph 0057 of Japanese Unexamined Patent Publication (KOKAI) No. 2015-28830.

However, the above polyester chain is not limited to a structure derived from polyester obtained by lactone ring-opening polymerization. It can have a structure derived from polyester obtained by a known polyester synthesis method such as polycondensation of a polyvalent carboxylic acid and polyhydric alcohol or polycondensation of a hydroxycarboxylic acid.

From the perspective of facilitating control of the 1-bromonaphthylene contact angle, the number average molecular weight of the polyester chain is desirably greater than or equal to 200, preferably greater than or equal to 400, and more preferably, greater than or equal to 500. From the same perspective, the number average molecular weight of the polyester chain is desirably less than or equal to 100,000, preferably less than or equal to 50,000. The term "number average molecular weight of the polyester chain" refers to a value that is obtained as described in paragraph 0059 of Japanese Unexamined Patent Publication (KOKAI) No. 2015-28830.

(Weight Average Molecular Weight of the Polyalkyleneimine Polymer)

The average molecular weight of the polyalkyleneimine polymer is, for example, greater than or equal to 1,000, and also by way of example, less than or equal to 80,000, as a weight average molecular weight. The weight average molecular weight of the polyalkyleneimine polymer is desirably greater than or equal to 1,500, preferably greater than or equal to 2,000, and more preferably, greater than or equal to 3,000. In one embodiment, the weight average molecular weight of the polyalkyleneimine polymer is desirably less than or equal to 60,000, preferably less than or equal to 40,000, more preferably less than or equal to 35,000, still more preferably less than or equal to 34,000, still further preferably less than or equal to 30,000, still further more preferably less than or equal to 20,000, yet still further more preferably, less than or equal to 10,000.

In the present invention and the present specification, the term "weight average molecular weight of the polyalkyleneimine polymer" refers to a value that is obtained by gel permeation chromatography (GPC) and converted to the standard styrene conversion. Reference can be made to Examples of Japanese Unexamined Patent Publication (KOKAI) No. 2015-28830, for measurement conditions.

(Synthesis Method)

The method of synthesizing the polyalkyleneimine polymer is not specifically limited. For one desirable form of a synthesis method, reference can be made to Japanese Unexamined Patent Publication (KOKAI) No. 2015-28830, paragraphs 0061 to 0069 and the Examples of the same.

(Other Polymer Chains)

The polyalkyleneimine polymer can have polymer chain(s) other than a polyester chain, or can have polymer chain(s) other than a polyester chain in addition to a polyester chain. As regards the introduction of a polyester chain, such a polymer chain can be introduced into a polyalkyleneimine polymer by a method identical to the method described in the above-cited paragraphs of Japanese Unexamined Patent Publication (KOKAI) No. 2015-28830, for example.

<<Other Amine Polymers>>

The above-described polyalkyleneimine polymer is a type of amine polymer. The nitrogen-containing polymer can be an amine polymer other than a polyalkyleneimine polymer. Further, a polyalkyleneimine polymer and another amine polymer can be employed in combination.

The amine polymer can be a primary amine denoted by $NH_2R$, a secondary amine denoted by $NHR_2$, or a tertiary amine denoted by $NR_3$. In these formulas, R denotes any structure constituting an amine polymer. A plurality of R being present can be identical or different.

Examples of the polymer chain that is present on the amine polymer are various polymer chains such as polyester chains, polyamide chains, and polyurethane chains. The number average molecular weight of the polymer chain desirably falls within the range given for the polyester chain of the polyalkyleneimine polymer set forth above. Amine polymers synthesized by known methods, as well as commercial products, can be employed. Specific examples of commercial products are ANTI-TERRA-U/U100, ANTI-TERRA-204/205, DISPERBYK-101, DISPERBYK-102, DISPERBYK-103, DISPERBYK-106, DISPERBYK-108, DISPERBYK-109, DISPERBYK-110, DISPERBYK-111, DISPERBYK-112, DISPERBYK-116, DISPERBYK-130, DISPERBYK-140, DISPERBYK-142, DISPERBYK-145, DISPERBYK-161, DISPERBYK-162, DISPERBYK-163, DISPERBYK-164, DISPERBYK-166, DISPERBYK-160, DISPERBYK-167, DISPERBYK-168, DISPERBYK-170, DISPERBYK-171, DISPERBYK-174, DISPERBYK-180, DISPERBYK-182, DISPERBYK-183, DISPERBYK-184, DISPERBYK-185, DISPERBYK-2000, DISPERBYK-2001, DISPERBYK-2020, DISPERBYK-2050, DISPERBYK-2070, DISPERBYK-2096, DISPERBYK-2150, BYK-P104, BYK-P105, BYK-9076, BYK-9077, BYK-220S, manufactured by BYK Japan. However, the amine polymer is not limited to those exemplified above.

One or more of the nitrogen-containing polymers set forth above can be contained in the magnetic layer. From the perspective of ease of controlling the 1-bromonaphthalene contact angle, the content of the nitrogen-containing polymer, desirably the amine polymer, in the magnetic layer is desirably greater than or equal to 0.5 weight part, preferably greater than or equal to 1.0 weight part, per 100.0 weight parts of ferromagnetic powder. From the same perspective, the content of the nitrogen-containing polymer in the magnetic layer is desirably less than or equal to 50.0 weight parts, preferably less than or equal to 40.0 weight parts, more preferably less than or equal to 30.0 weight parts, still more preferably less than or equal to 20.0 weight parts, and yet more preferably, less than or equal to 15.0 weight parts, per 100 weight parts of ferromagnetic powder.

One or more of the above nitrogen-containing polymers can be contained in the backcoat layer. From the perspective of ease of controlling the 1-bromonaphthalene contact angle, the content of the nitrogen-containing polymer, desirably an amine polymer, in the backcoat layer is desirably greater than or equal to 0.5 weight part, preferably greater than or equal to 1.0 weight part, per 100.0 weight parts of nonmagnetic powder. From the same perspective, the content of the nitrogen-containing polymer in the backcoat layer is desirably less than or equal to 50.0 weight parts, preferably less than or equal to 40.0 weight parts, more preferably less than or equal to 30.0 weight parts, still more preferably less than or equal to 20.0 weight parts, and yet still more preferably, less than or equal to 15.0 weight parts, per 100 weight parts of nonmagnetic powder.

Various layers and nonmagnetic support of the above magnetic tape will be further described in detail below.

[Magnetic Layer]

<Ferromagnetic Powder>

The magnetic layer contains ferromagnetic powder and binder. Various powders that are commonly employed as ferromagnetic powder in the magnetic layers of magnetic recording media such as magnetic tapes can be employed as the ferromagnetic powder. The use of ferromagnetic powder of small average particle size is desirable from the perspective of enhancing the recording density of the magnetic tape. To that end, the ferromagnetic powder with an average particle size of less than or equal to 50 nm is desirably employed. From the perspective of the stability of magnetization, the ferromagnetic powder with an average particle size of greater than or equal to 10 nm is desirably employed.

The average particle size of the ferromagnetic powder is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and the present specification, the average particle size of the powder, such as ferromagnetic powder and various kinds of powder, is the average particle size as obtained by the above method, unless otherwise stated. The average particle size indicated in Examples further below was obtained using a Model H-9000 transmission electron microscope made by Hitachi and KS-400 image analysis software made by Carl Zeiss, unless otherwise stated.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention and the present specification, the size of the particles constituting powder such as ferromagnetic powder (referred to as the "particle size", hereinafter) is denoted as follows based on the shape of the particles observed in the above particle photograph:
(1) When acicular, spindle-shaped, or columnar (with the height being greater than the maximum diameter of the bottom surface) in shape, the particle size is denoted as the length of the major axis constituting the particle, that is, the major axis length.
(2) When platelike or columnar (with the thickness or height being smaller than the maximum diameter of the plate surface or bottom surface) in shape, the particle size is denoted as the maximum diameter of the plate surface or bottom surface.
(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

Ferromagnetic hexagonal ferrite powder is a specific example of desirable ferromagnetic powder. From the perspectives of achieving higher density recording and magnetization stability, the average particle size (for example, average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size (for example, average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

The content (fill rate) of ferromagnetic powder in the magnetic layer desirably falls within a range of 50 weight % to 90 weight %, preferably within a range of 60 weight % to 90 weight %. Components other than ferromagnetic powder in the magnetic layer are at least binder, and one or more additives can be optionally incorporated. A high fill rate is desirable from the perspective of increasing recording density.

<Binder, Curing Agent>

The above magnetic tape is a particulate magnetic tape and contains ferromagnetic powder and binder in the magnetic layer. The binder contains one or more resins. The resins can be homopolymers or copolymers. The various resins that are commonly employed as binders in particulate magnetic recording media such as magnetic tapes can be employed as the binder. Examples of binders are: polyurethane resin, polyester resin, polyamide resin, vinylchloride resin, styrene, copolymerized acrylic resin of acrylonitrile, methyl methacrylate, and the like; nitrocellulose and other cellulose resin; epoxy resin; phenoxy resin; and polyvinyl acetal, polyvinyl butyral, and other polyvinyl alkyral resin. These can be employed singly, or multiple resins can be mixed for use. Of these, polyurethane resin, acrylic resin, cellulose resin, and vinylchloride resin are desirable. These resins can also be employed as binders in the backcoat layer described further below and in the nonmagnetic layer that can be provided. Reference can be made to Japanese Unexamined Patent Publication (KOKAI) No. 2010-24113, paragraphs 0028 to 0031, with regard to these resins. The content of the above publication is expressly incorporated herein by reference in its entirety. The average molecular weight of resins that are employed as binders is, by way of example, greater than or equal to 30,000, and less than or equal to 200,000 as a weight average molecular weight.

A curing agent can be employed along with the above resins employed as binders. The curing agent can be a thermosetting compound—a compound in which a curing reaction (crosslinking reaction) progresses when heated—in one embodiment. In another embodiment, the curing agent can be a photo-curable compound—a compound in which a curing reaction (crosslinking reaction) progresses when irradiated with light. Thermosetting compounds are desirable as curing agents; polyisocyanate is suitable. Reference can be made to Japanese Unexamined Patent Publication 2011-216149, paragraphs 0124 and 0125, for details regarding polyisocyanate. In the magnetic layer-forming composition, the curing agent can be employed, for example, in a quantity of 0 to 80.0 weight parts per 100.0 weight parts of binder. From the perspective of enhancing strength of the magnetic layer, a curing agent can be added in a quantity of 50.0 to 80.0 weight parts for use.

<Additives>

Ferromagnetic powder and binder are contained in the magnetic layer. As necessary, one or more additives can also be contained. Examples of additives are the above curing agents. A curing agent can be incorporated into the magnetic layer in a state such that at least a portion thereof undergoes a (crosslinking) reaction with another component such as the binder as the curing reaction progresses in the magnetic layer-forming process. The same applies to the layer that is formed with the composition in cases where the composition that is employed to form another layer such as the backcoat layer-forming composition contains a curing agent. Examples of additives contained in the magnetic layer are nonmagnetic powder (such as inorganic powder and carbon black), lubricants, dispersing agents, dispersion adjuvants, antifungal agents, antistatic agents, and oxidation inhibitors. Examples of nonmagnetic powder is nonmagnetic powder capable of functioning as abrasives and nonmagnetic powder capable of functioning as protrusion-forming agents that form protrusions that suitably protrude from the surface of the magnetic layer (such as nonmagnetic colloidal particles). In the present invention and the present specification, the term "colloidal particles" refers to particles capable of dispersing without precipitating to form a colloidal dispersion when added in a proportion of 1 g per 100 mL of an organic solvent in the form of at least one member of the group consisting of methyl ethyl ketone, cyclohexanone, toluene, ethyl acetate, and two or more of these solvents in any blending ratio. The average particle size of the colloidal silica (silica colloid particles) indicated in Examples further below is a value obtained by the method described as the method of measuring the average particle diameter in Japanese Unexamined Patent Publication (KOKAI) No. 2011-048878, paragraph 0015. The additives can be employed in any quantity by suitably selecting commercial products based on the properties desired. An example of an additive that can be employed in a magnetic layer containing an abrasive is the dispersing agent for enhancing dispersion of abrasive that is described in paragraphs 0012 to 0022 of Japanese Unexamined Patent Publication (KOKAI) No. 2013-131285, which is expressly incorporated herein by reference in its entirety.

The above-described magnetic layer can be provided directly on the surface of a nonmagnetic support or over a nonmagnetic layer on the surface of a nonmagnetic support. Details regarding the nonmagnetic layer and the nonmagnetic support will be given further below.

[Nonmagnetic Layer]

The nonmagnetic layer will be described next. In the above magnetic tape, a magnetic layer can be present directly on the nonmagnetic support, or a magnetic layer can be present over at least one other layer on the nonmagnetic support. This other layer is desirably a nonmagnetic layer containing nonmagnetic powder and binder. The nonmagnetic powder that is employed in the nonmagnetic layer can be an organic or an inorganic substance. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably falls within a range of 50 weight % to 90 weight %, preferably within a range of 60 weight % to 90 weight %.

Known techniques can be applied to the nonmagnetic layer with regard to the binder, additives, and other details relating to the nonmagnetic layer. For example, known techniques relating to the magnetic layer can be applied to the quantity and type of binder and the quantity and type of additives.

The nonmagnetic layer in the above magnetic tape may be in the form of an essentially nonmagnetic layer containing small quantities of ferromagnetic powder, either in the form of impurities or by intention, for example, along with nonmagnetic powder. In the present invention, the term "essentially nonmagnetic layer" refers to a layer with a residual magnetic flux density of less than or equal to 10 mT, a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

[Backcoat Layer]

In the above magnetic tape, a backcoat layer is present on the surface on the opposite side of the nonmagnetic support from that on which the magnetic layer is present. As set forth above, the backcoat layer is less than or equal to 0.20 μm in thickness, and the 1-bromonaphthalene contact angle measured on the surface of the backcoat layer falls within a range of 10.0° to 30.0°. The backcoat layer contains nonmagnetic powder and binder. As set forth above, the backcoat layer can contain a 1-bromonaphthalene contact angle-adjusting component. Further, the backcoat layer can contain optional known additives. Known techniques relating to backcoat layers, magnetic layers and nonmagnetic layers can be applied to other details relating to the backcoat layer, such as the binder and additives.

Either carbon black or nonmagnetic powder other than carbon black, or both, can be employed as the nonmagnetic powder contained in the backcoat layer. Examples of nonmagnetic powder other than carbon black are various powder of inorganic substances (inorganic powder). Specific examples are inorganic powder such as iron oxides (such as bengala (colcothar)), titanium oxides such as titanium dioxide, cerium oxide, tin oxide, tungsten oxide, ZnO, $ZrO_2$, SiO$_2$, Cr$_2$O$_3$, α-alumina, β-alumina, γ-alumina, goethite, corundum, silicon nitride, titanium carbide, magnesium oxide, boron nitride, molybdenum disulfide, copper oxide, MgCO$_3$, CaCO$_3$, BaCO$_3$, SrCO$_3$, BaSO$_4$, silicon carbide, and titanium carbide. The above description relating to the nonmagnetic powder contained in the nonmagnetic layer can be referred to with regard to the nonmagnetic powder contained in the backcoat layer.

The nonmagnetic powder other than carbon black can be acicular, spherical, polyhedral, or plate-like in shape. The average particle size of the nonmagnetic powder desirably falls within a range of 0.005 μm to 2.00 μm and preferably falls within a range of 0.01 μm to 0.20 μm. The specific surface area of the nonmagnetic powder determined by the Brunauer-Emmett-Teller (BET) method (BET specific surface area) desirably falls within a range of 1 m$^2$/g to 100 m$^2$/g, preferably 5 m$^2$/g to 70 m$^2$/g, and more preferably, within a range of 10 m$^2$/g to 65 m$^2$/g. The average particle size of the carbon black falls, for example, within a range of 5 nm to 80 nm, desirably 10 nm to 50 nm, and more preferably, within a range of 10 nm to 40 nm. Reference can be made to the description given above with regard to the nonmagnetic powder of the nonmagnetic layer for the content (fill rate) of nonmagnetic powder in the backcoat layer. The content of carbon black falls, for example, within a range of 10.0 to 100.0 weight parts per 100.0 weight parts of the total quantity of nonmagnetic powder. The entire quantity of nonmagnetic powder can also consist of carbon black. Alternatively, the entire quantity of nonmagnetic powder can consist of nonmagnetic powder other than carbon black. Carbon black is thought to have the property of having a lesser tendency to adsorb fatty acids than other nonmagnetic powders. Thus, it is to be inferred that the greater the proportion of the nonmagnetic powder that is accounted for by carbon black in the backcoat layer, the less fatty acid tends to accumulate within the backcoat layer and the more readily fatty acid tends to be supplied to the surface of the backcoat layer. It is thought that the greater the quantity of fatty acid supplied to the surface of the backcoat layer, the higher the value of the 1-bromonaphthalene contact angle measured on the surface of the backcoat layer. It is also possible to adjust the 1-bromonaphthalene contact angle by adjusting the type and ratio of nonmagnetic powder in the backcoat layer in this manner.

[Nonmagnetic Support]

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

[Thickness of Nonmagnetic Support, Thickness of Various Layers]

The thickness of the nonmagnetic support is desirably 3.00 μm to 20.00 μm, preferably 3.00 μm to 10.00 μm, more preferably 3.00 μm to 6.00 μm, and still more preferably, 3.00 μm to 4.50 μm.

The thickness of the magnetic layer is desirably optimized based on the saturation magnetization of the magnetic head employed, the head gap length, the bandwidth of the recording signal, and the like. To achieve higher density recording, the thickness of the magnetic layer is desirably 10 nm to 100 nm, preferably 20 nm to 90 nm. The magnetic layer can consist of at least one layer, or can be separated into two or more layers having different magnetic characteristics applying a known multilayer magnetic layer configuration. When separated into two or more layers, the thickness of the magnetic layer refers to the combined thickness of the layers.

The thickness of the nonmagnetic layer is, for example, greater than or equal to 0.05 μm, preferably greater than or equal to 0.07 μm, and more preferably, greater than or equal to 0.10 μm. Additionally, the thickness of the nonmagnetic layer is desirably less than or equal to 0.80 μm, preferably less than or equal to 0.50 μm.

The thickness of the backcoat layer is as set forth above. Reducing the thickness of the backcoat layer is one example of a way to reduce the thickness of the magnetic tape. From the perspective of increasing the recording capacity per magnetic tape cartridge by reducing the thickness of the magnetic tape, the overall thickness of the above magnetic tape is desirably less than or equal to 6.00 μm, preferably less than or equal to 5.00 μm, and more preferably, less than or equal to 4.50 μm. From the perspective of ease of handling (the handling property) of the magnetic tape, the overall thickness of the magnetic tape is desirably greater than or equal to 1.00 μm.

The thickness of the various layers and nonmagnetic support of the magnetic tape can be determined by known film thickness measurement methods. As an example, the cross section of the magnetic tape in the direction of thickness can be exposed by a known method such as an ion beam or microtome, and the exposed cross section can be observed by a scanning electron microscope. The various thicknesses can be determined as the thickness determined at one spot in the direction of thickness, or as the arithmetic average of the thicknesses obtained at multiple spots, such as two or more randomly extracted spots. The thickness of the various layers can also be determined as the design thickness calculated from the manufacturing conditions.

[Process of Manufacturing Magnetic Tape]

The above magnetic tape is a particulate magnetic tape and can be manufactured using compositions (coating liquids) to form the individual layers, such as the magnetic layer, backcoat layer, and optionally provided nonmagnetic layer. A specific form of the process of manufacturing the magnetic tape will be described below. However, the magnetic tape of an aspect of the present invention requires only that the thickness of the backcoat layer, and the 1-bromonaphthalene contact angles measured on the surface of the magnetic layer and on the surface of the backcoat layer, fall within the respective ranges set forth above, and is not limited to being manufactured by the manufacturing process of the form set forth below.

<Preparation of Compositions for Forming Various Layers>

The compositions (coating liquids) for forming various layers can be provided normally contain solvent in addition to the various components that have been set forth above. Examples of the solvent are the various organic solvents generally employed in the manufacturing of particulate magnetic recording media. The process of preparing the compositions for forming the various layers normally includes at least a kneading step, a dispersion step, and mixing steps provided before and after these steps as needed. Each of these steps can be divided into two or more stages. All of the materials in the form of ferromagnetic powder, nonmagnetic powder, binder, various additives, solvent, and the like can be added at the start, or part way through, any of these steps. The material can be divided for addition in two or more steps. For example, in one embodiment, a dispersion (magnetic liquid) containing ferromagnetic powder and a dispersion (abrasive liquid) containing abrasive can be separately prepared by dispersion, and then simultaneously or sequentially mixed with the other components to prepare a magnetic layer-forming composition. Additionally, reference can be made to paragraph 0065 of Japanese Unexamined Patent Publication (KOKAI) No. 2010-231843, which is expressly incorporated herein by reference in its entirety, with regard to preparing individual layer-forming compositions.

<Coating Process>

The magnetic layer can be formed by directly coating the magnetic layer-forming composition, or by sequentially or simultaneous multilayer coating it with the nonmagnetic layer-forming composition, on the surface of a nonmagnetic support. The surface of the magnetic layer can also be surface treated. Surface treatment is desirable to enhance the surface smoothness of the magnetic layer. An example of the surface treatment of the surface of the magnetic layer is a polishing treatment employing the polishing means described in Japanese Unexamined Patent Publication (KOKAI) Heisei No. 5-62174, which is expressly incorporated herein by reference in its entirety. Reference can be made to paragraphs 0005 to 0032 and the entirety of the drawings of the same publication with regard to the surface treatment.

The backcoat layer can be formed by coating the backcoat layer-forming composition on the surface on the opposite side of the nonmagnetic support from that on which the magnetic layer has been provided, or is to be provided.

Reference can be made to Japanese Unexamined Patent Publication (KOKAI) No. 2010-231843, paragraph 0066, for details regarding coatings to form various layers.

<Other Processes>

Reference can be made to Japanese Unexamined Patent Publication (KOKAI) No. 2010-231843, paragraphs 0067 to 0070, regarding various other processes in manufacturing a magnetic tape.

The magnetic tape according to an aspect of the present invention that has been described above can be housed in a magnetic tape cartridge and can be used to record, store, and reproduce information in the form of magnetic signals. In the magnetic tape cartridge, the magnetic tape is generally housed in a wound state on a reel within the cartridge main body. The reel is disposed in rotatable fashion within the cartridge main body. Single reel-type magnetic tape cartridges equipped with a single reel in the cartridge main body and dual reel-type magnetic tape cartridges with two reels in the cartridge main body are widely employed as magnetic tape cartridges. When a single-reel magnetic tape cartridge is loaded into a magnetic recording and reproducing device (drive) to record and/or reproduce a magnetic signal on the magnetic tape, the magnetic tape is drawn out of the magnetic tape cartridge and taken up on a reel on the drive side. A magnetic head is disposed on the tape conveyance route from the magnetic tape cartridge to the take-up reel. Magnetic tape feeding and winding take place between the reel (feed reel) on the magnetic tape cartridge side and the reel (tape-up reel) on the drive side. In this space, the magnetic head and the surface of the magnetic layer of the magnetic tape come into contact (slide against each other) to conduct magnetic signal recording and reproduction. By contrast, in a dual-reel magnetic tape cartridge, the two reels of the feed reel and the take-up reel are provided within the magnetic tape cartridge. The magnetic tape according to an aspect of the present invention can be housed either in the single-reel type or dual-reel type magnetic tape cartridge. The configuration of the magnetic tape cartridge is known.

Following the recording of magnetic signals, archive magnetic tapes are stored for extended periods in a state wound up on a reel within a magnetic tape cartridge. The above magnetic tape according to an aspect of the present invention has a backcoat layer that has been reduced in thickness to less than or equal to 0.20 μm and can inhibit the generation of head surface deposits with repeated running following long-term storage equivalent to data storage on an archive magnetic medium.

EXAMPLES

The present invention will be described in greater detail below through Examples. However, the present invention is not limited to the embodiments shown in Examples. The "parts" indicated below denotes "weight parts" unless otherwise stated.

Polymer A below, which was employed as a 1-bromonaphthalene contact angle-adjusting component, is a polyalkyleneimine polymer synthesized by the following method. A commercial amine polymer (DISPERBYK-102 made by BYK Japan) was employed as polymer B below.

Synthesis Example of Polymer A
(Polyalkyleneimine Polymer)

The acid values and amine values given below were determined by the potentiometric method (solvent: tetrahydrofuran/water=100/10 (volumetric ratio), titrant: 0.01 N (0.01 mol/L) sodium hydroxide aqueous solution (acid value), 0.01 N (0.01 mol/L) hydrochloric acid (amine value)).

The number average molecular weights and weight average molecular weights given below were obtained by measurement by GPC and converted to polystyrene values.

The various measurement conditions for the average molecular weight of polyester, polyalkyleneimine, and polyalkyleneimine polymer were as given below.

(Measurement Conditions for Average Molecular Weight of Polyester)

Measurement apparatus: HLC-8220 GPC (made by Tosoh Corp.)

Column: TSKgel Super HZ 2000/TSKgel Super HZ 4000/TSKgel Super HZ-H (made by Tosoh Corp.)

Eluent: Tetrahydrofuran (THF)

Flow rate: 0.35 mL/min

Column temperature: 40° C.

Detector: Differential refractive (RI) detector (Measurement Conditions for Average Molecular Weight of Polyalkyleneimine and Average Molecular Weight of Polyalkyleneimine Polymer)

Measurement apparatus: HLC-8320 GPC (made by Tosoh Corp.)

Column: Three TSKgel Super AWM-Hs (made by Tosoh Corp.)

Eluent: N-methyl-2-pyrrolidone (with 10 mM lithium bromide added as additive)

Flow rate: 0.35 mL/min

Column temperature: 40° C.

Detector: RI (Synthesis of Polyester (i-1))

In a 500 mL, three-necked flask were mixed 16.8 g of carboxylic acid in the form of n-octanoic acid (Wako Pure Chemical Industries, Ltd.), 100 g of lactone in the form of ε-caprolactone (Praxel M made by Daicel Chemical Industries, Inc.), and 2.2 g of catalyst in the form of monobutyltin oxide (Wako Pure Chemical Industries, Ltd.) ($C_4H_9Sn(O)$ OH) and the mixture was heated for 1 hour at 160° C. A 100 g quantity of ε-caprolactone was added dropwise over 5 hours and the mixture was stirred for another two hours. Subsequently, the mixture was cooled to room temperature, yielding polyester (i-1).

The synthesis schema is indicated below.

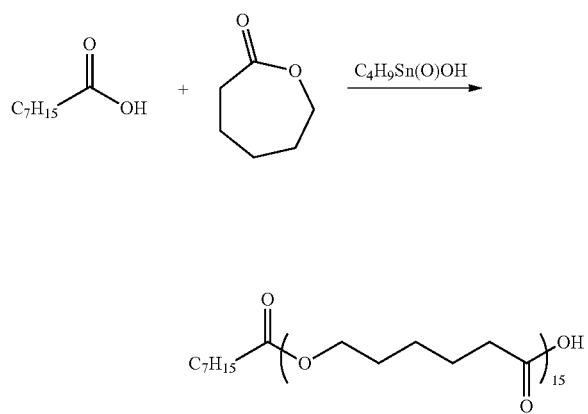

The number average molecular weight and weight average molecular weight of the polyester obtained are given in Table 1 below. The number of units of lactone repeating unit that was calculated from the starting material charge ratio is also given in Table 1.

(Synthesis of Polyethyleneimine Polymer)

A 2.4 g quantity of polyethyleneimine (SP-006, made by Nippon Shokubai Co., number average molecular weight 600) and 100 g of polyester (i-1) were mixed and heated for 3 hours at 110° C., yielding polyethyleneimine polymer.

Based on the results of two forms of NMR analysis, $^1$H-NMR and $^{13}$C-NMR, and on the results of elemental analysis by the combustion method conducted on the polyalkyleneimine polymer that was obtained, the ratio (polyalkyleneimine chain ratio) accounted for by the polyalkyleneimine chain in the polyalkyleneimine polymer was calculated. The results are given in Table 1. The calculated polyalkyleneimine chain ratio was the same value as the value calculated from the quantities of polyalkyleneimine and polyester charged.

[Example of Fabrication of Magnetic Tape]

Example 1

The formulas of the compositions for forming the various layers are given below.

(Magnetic Layer-Forming Composition)
(Magnetic Liquid)
Ferromagnetic powder (ferromagnetic hexagonal barium ferrite powder): 100.0 parts
  (Coercive force He: 196 kA/m (2460 Oe), average particle size (average plate diameter): 24 nm)
Oleic acid: 2.0 parts
Vinyl chloride copolymer (MR-104 made by Zeon Corp.): 10.0 parts
SO$_3$Na group-containing polyurethane resin: 4.0 parts
  (Weight average molecular weight: 70,000; SO$_3$Na groups: 0.07 meq/g)
1-Bromonaphthalene contact angle-adjusting component (see Table 2): See Table 2
Methyl ethyl ketone: 150.0 parts
Cyclohexanone: 150.0 parts
(Abrasive Liquid)
α-Alumina (BET specific surface area: 19 m$^2$/g): 6.0 parts
SO$_3$Na group-containing polyurethane resin: 0.6 part
  (Weight average molecular weight: 70,000; SO$_3$Na groups: 0.1 meq/g)
2,3-Dihydroxynaphthalene: 0.6 part
Cyclohexanone: 23.0 parts
(Protrusion-Forming Agent Liquid)
Colloidal silica (average particle size: 120 nm): 2.0 parts
Methyl ethyl ketone: 8.0 parts
(Lubricant and Curing Agent Liquid)
Stearic acid: See table 2
Amide stearate: 0.3 part
Butyl stearate: 6.0 parts
Methyl ethyl ketone: 110.0 parts
Cyclohexanone: 110.0 parts
Polyisocyanate (Coronate (Japanese registered trademark) L made by Nippon Polyurethane Industry Co., Ltd.): 3.0 parts

TABLE 1

| | Polyester | Carboxylic acid | Quantity of carboxylic acid charged (g) | Lactone | Weight average molecular weight | Number average molecular weight | Number of repeating lactone units |
|---|---|---|---|---|---|---|---|
| Synthesis of polyester | (i-1) | n-octanoic acid | 16.8 | ε-caprolactone | 7,000 | 5,800 | 15 |

| | Quantity of polyethyleneimine charged (g) | Polyalkyleneimine chain (polyethyleneimine chain) ratio | Polyester | Acid value (mgKOH/g) | Amine value (mgKOH/g) | Weight average molecular weight |
|---|---|---|---|---|---|---|
| Synthesis of polyalkyleneimine (polyethyleneimine) polymer | 2.4 | 2.3 | (i-1) | 35.0 | 17.4 | 7,000 |

(Nonmagnetic Layer-Forming Composition)
Carbon black: 100.0 parts
   (Average particle size: 16 nm; dibutyl phthalate DBP absorption capacity: 74 cm$^3$/100 g)
Trioctylamine: 4.0 parts
Vinyl chloride copolymer (MR-104 made by Zeon Corp.): 19.0 parts
SO$_3$Na group-containing polyurethane resin: 12.0 parts
   (Weight average molecular weight: 50,000; SO$_3$Na groups: 0.07 meq/g)
Methyl ethyl ketone: 370.0 parts
Cyclohexanone: 370.0 parts
Stearic acid: 2.0 parts
Amide stearate: 0.3 part
Butyl stearate: 2.0 parts
(Backcoat Layer-Forming Composition)
Bengala: 80.0 parts
   (Average particle size: 0.15 μm, average acicular ratio: 7, BET specific surface area: 52 m$^2$/g)
Carbon black: 20.0 parts
   (Average particle size: 16 nm, DBP absorption capacity: 74 cm$^3$/100 g)
Phenylphosphonic acid: 3.0 parts
Vinyl chloride copolymer (MR-104 made by Zeon Corp.): 12.0 parts
SO$_3$Na group-containing polyurethane resin: 8.0 parts
   (Weight average molecular weight: 50,000; SO$_3$Na groups: 0.07 meq/g)
1-Bromonaphthalene contact angle-adjusting component (see Table 2): See Table 2
α-Alumina (BET specific surface area: 17 m$^2$/g): 5.0 parts
Methyl ethyl ketone: 370.0 parts
Cyclohexanone: 370.0 parts
Stearic acid: See Table 2
Amide stearate: 0.3 part
Butyl stearate: 2.0 parts
Polyisocyanate (Coronate L made by Nippon Polyurethane Industry Co., Ltd.): 5.0 parts (Preparation of Magnetic Layer-Forming Composition)

A magnetic layer-forming composition was prepared by the following method.

After kneading and dilution processing the above magnetic liquid in an open kneader, 30 passes of dispersion processing were conducted at a bead fill rate of 80 volume %, a rotor tip peripheral speed of 10 m/s, and a single pass retention time of 2 minutes in a horizontal bead mill disperser using zirconia (ZrO$_2$) beads 0.1 mm in bead diameter (referred to as "Zr beads" hereinafter).

As regards the abrasive liquid, the above components were mixed and then charged with Zr beads 0.3 mm in bead diameter to a horizontal bead mill disperser. The bead volume/(abrasive liquid volume+bead volume) was adjusted to 80% and bead mill dispersion processing was conducted for 120 minutes. Following processing, the liquid was removed and a flow-type ultrasonic dispersion and filtration device was used to conduct an ultrasonic dispersion and filtration treatment.

The magnetic liquid, abrasive liquid, and protrusion-forming agent liquid, as well as other components in the form of the lubricant and curing agent liquid were introduced into a dissolver stirrer and stirred for 30 minutes at a peripheral speed of 10 m/s. Subsequently, three passes of treatment at a flow rate of 7.5 kg/min were conducted with a flow-type ultrasonic disperser and the dispersion was filtered through a filter with a pore diameter of 1 μm to prepare a magnetic layer-forming composition.

(Preparation of Nonmagnetic Layer-Forming Composition)

A nonmagnetic layer-forming composition was prepared by the following method.

With the exception of the lubricants (stearic acid, amide stearate, and butyl stearate), the above components were kneaded and dilution processed in an open kneader. Subsequently, they were dispersion treated in a horizontal bead mill disperser. The lubricants (stearic acid, amide stearate, and butyl stearate) were then added and the mixture was stirred and mixed in a dissolver stirrer to prepare a nonmagnetic layer-forming composition.

(Preparation of Backcoat Layer-Forming Composition)

A backcoat layer-forming composition was prepared by the following method.

With the exception of the polyisocyanate and lubricants (stearic acid, amide stearate, and butyl stearate), the above components were charged to a dissolver stirrer, stirred for 30 minutes at a peripheral speed of 10 m/s, and then dispersion processed in a horizontal bead mill disperser. Subsequently, the polyisocyanate and lubricants (stearic acid, amide stearate, and butyl stearate) were added and the mixture was stirred and mixed in a dissolver stirrer to prepare a backcoat layer-forming composition.

(Fabrication of Magnetic Tape)

The nonmagnetic layer-forming composition was coated and dried to a dry thickness of 0.10 μm on one surface of a nonmagnetic support (polyamide support) 4.00 μm in thickness. Subsequently, the backcoat layer-forming composition was coated and dried to a dry thickness of 0.20 μm on the surface on the opposite side of the nonmagnetic support. The nonmagnetic support, having been wound up on a winding roll, was heat treated for 36 hours in an environment of an atmospheric temperature of 70° C.

Following the heat treatment, the magnetic layer-forming composition was coated and dried to a dry thickness of 70 nm on the nonmagnetic layer.

Subsequently, a surface-smoothing treatment (calendering treatment) was conducted at a calender roll surface temperature of 100° C., a linear pressure of 300 kg/cm (294 kN/m), and a speed of 100 m/min with a calender comprised only of metal rolls. Subsequently, a heat treatment was conducted for 36 hours in an environment of an atmospheric temperature of 70° C. Following the heat treatment, the product was slit to ½ inch (0.0127 meter) width.

Next, after winding onto a reel into roll form the magnetic tape obtained by a surface treatment (the embodiment shown in FIGS. 1 to 3 of Japanese Unexamined Patent Application (KOKAI) Heisei No. 5-62174) employing the diamond wheel described in the same publication, the properties thereof were evaluated by the following evaluation method. Two tape samples were prepared for various contact angle measurements and acceleration tests equivalent to long-term storage for each of the Examples, Reference Examples, and Comparative Examples. One of the tape samples was employed to measure the various contact angles without implementing an acceleration test equivalent to long term storage. The other tape sample was subjected to an acceleration test equivalent to long-term storage. In the acceleration test equivalent to long-term storage, the tape sample, in a state of having been wound up on a reel, was stored for five days in an environment of a temperature of 40° C. and 80% relative humidity. The acceleration test was equivalent to storage for greater than or equal to 10 years in an environment of room temperature (about 20° to 25° C.).

In the present Example and the Examples, Reference Examples, and Comparative Examples described further below, the thickness of each layer was the design thickness calculated from the manufacturing conditions.

Examples 2 to 8, Reference Example 1, and Comparative Examples 1 to 7

With the exceptions that the values given in Table 2 were adopted for the thickness of the backcoat layer, the formula of the magnetic layer-forming composition, and/or the formula of the backcoat layer-forming composition, magnetic tapes were prepared by the same method as in Example 1.

[Evaluation Method]

(1) 1-Bromonaphthalene Contact Angle

The contact angle was measured by the following method with a contact angle measuring device (Drop Master 700 contact angle measuring device made by Kyowa Interface Science (Ltd.)).

A tape sample, obtained by cutting a prescribed length from one end of a magnetic tape that had been wound into a roll, was placed on a slide glass such that the surface of the backcoat layer was in contact with the surface of the slide glass. A 2.0 μL quantity of measurement liquid (1-bromonaphthalene) was dripped onto the surface of the tape sample (surface of the magnetic layer). After leaving for one second as a period for forming stable droplet, the droplet image was analyzed by contact angle analysis software FAMAS that came with the above contact angle measuring device and the contact angle of the tape sample and the droplet was measured. The contact angle was calculated by the θ/2 method. The arithmetic average of 6 measurements taken for each sample was adopted as the 1-bromonaphthalene contact angle measured on the surface of the magnetic layer. The measurement was conducted in an environment of a temperature of 25° C. and 25% relative humidity. The 1-bromonaphthalene contact angles were obtained under the following analysis conditions.

A new tape sample was cut from the same magnetic tape roll and placed on a glass slide so that the surface of the magnetic layer was in contact with the surface of the glass slide, and the 1-bromonaphthalene contact angle measured on the surface of the backcoat layer was obtained by the same method as that set forth above.

Method: Liquid drop method (θ/2 method)
Recognition of liquid attachment: automatic
Liquid attachment recognition line (distance from top of needle): 50 dot
Algorithm: automatic
Image mode: frame
Threshold level: automatic (2) Water Contact Angle A new tape sample was cut from the same magnetic tape roll as in (1) above and the water contact angle was measured on the surface of the magnetic layer by the same method as in (1) above with the exception that the measurement-use liquid was replaced with water.

(3) Evaluation of Head Surface Deposits after the Acceleration Test Equivalent to Long-Term Storage, Whether Head Edge Deposits were Present, and the Degree Thereof In an environment of an atmospheric temperature of 40° C. and 80% relative humidity, a magnetic recording and reproduction head that had been removed from a Linear Tape-Open Generation 5 (LTO (Japanese registered trademark) G5, made by IBM Corp.) drive was mounted on a tape running system. While applying a tension of 0.6 N, a magnetic tape 20 m in length following the above acceleration test equivalent to long-term storage was run 3,000 cycles at 8.0 m/s while not fed out from a feed roll and wound up on a winding roll. The entire surface of the head following running was observed with a 100-fold magnification microscope, and the ratio of the portions on which deposits had adhered was determined by image processing using image processing software (Win Roof (developed by Mitani Corporation)). The ratio of the area of the portions on which deposits had formed to the ratio of the head surface area was evaluated based on the following standard as an indicator of the whether head surface deposits were present and to what degree. Evaluation results of A and B, desirably A, could be evaluated as the generation of few head surface deposits with repeated running following the above long-term storage.

A: 0%; B: greater than 0% but less than 5%; C: greater than or equal to 5% but less than 10%; D: greater than or equal to 10% but less than 30%; E: greater than or equal to 30%.

For Examples 1 and 7, the entire surface of the head was observed under a microscope in the same manner, image processing was conducted with image processing software, and the ratio of portions on which head edge deposits had adhered was determined. The ratio of portions to which head edge deposits had adhered was employed as an indicator of whether head edge deposits were present and the degree thereof and evaluated by the following standard.

4: No deposits found on the head edge; 3: Deposits found on less than or equal to 50% of head edge portions; 2: Deposits found on greater than 50% but less than or equal to 70% of head edge portions; 1: Deposits found on greater than 70% of head edge portions.

FIG. 1 shows a descriptive drawing of head surface deposits and head edge deposits. In the drawing, the edges of the magnetic tape in the longitudinal direction are indicated by two solid lines. In the drawing, the symbol a denotes the head surface, b denotes head surface deposits, c denotes a head edge, and d denotes a head edge deposit. The numbers, shapes, and adhesion positions of the head surface deposits and head edge deposits shown in the drawing are mere schematic indications.

TABLE 2

|  |  |  | Ref. Ex. 1 | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- | --- | --- | --- |
| Magnetic layer-formimg composition | Contact angle-adjusting component (Polymer) | Type | A | None | None | A | A | None | A | A |
|  |  | Quantity added (parts) | 10.0 | — | — | 10.0 | 10.0 | — | 10.0 | 30.0 |
|  | Stearic acid | Quantity added (parts) | 3.0 | 2.0 | 2.0 | 3.0 | 3.0 | 2.0 | 3.0 | 3.0 |
| Backcoat layer-formimg composition | Contact angle-adjusting component (Polymer) | Type | None | None | None | None | None | A | None | A |
|  |  | Quantity added (parts) | — | — | — | — | — | 10.0 | 10.0 | 10.0 |
|  | Stearic acid | Quantity added (parts) | 0.2 | 1.0 | 2.0 | 1.0 | 2.0 | 1.0 | 3.0 | 1.0 |
|  | Thickness (μm) |  | 0.30 | 0.20 | 0.20 | 0.20 | 0.20 | 0.20 | 0.20 | 0.20 |
| Magnetic laye | 1-bromonaphthalene contact angle (°) |  | 48.0 | 41.8 | 42.1 | 47.9 | 47.9 | 42.0 | 48.1 | 60.2 |
|  | Water contact angle (°) |  | 98.7 | 97.6 | 98.5 | 98.9 | 99.4 | 98.1 | 98.7 | 97.3 |

TABLE 2-continued

| | | | | | | | | | | |
|---|---|---|---|---|---|---|---|---|---|---|
| Backcoat layer | 1-bromonaphthalene contact angle (°) | | 9.2 | 3.2 | 8.5 | 3.3 | 8.5 | 20.6 | 35 | 20.5 |
| Evaluation of head surface deposits after the acceleration test equivalent to long-term storage | | | B | E | D | C | C | C | C | C |

| | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Magnetic layer-formimg composition | Contact angle-adjusting component (Polymer) | Type | A | A | B | A | A | A | None | A |
| | | Quantity added (parts) | 10.0 | 10.0 | 6.0 | 15.0 | 20.0 | 20.0 | — | 10.0 |
| | Stearic acid | Quantity added (parts) | 3.0 | 2.0 | 2.0 | 3.0 | 3.0 | 3.0 | 10.0 | 3.0 |
| Backcoat layer-formimg composition | Contact angle-adjusting component (Polymer) | Type | A | A | A | A | A | A | A | A |
| | | Quantity added (parts) | 10.0 | 10.0 | 10.0 | 10.0 | 10.0 | 10.0 | 10.0 | 10.0 |
| | Stearic acid | Quantity added (parts) | 1.0 | 0.2 | 1.0 | 1.0 | 1.0 | 2.0 | 1.0 | 1.0 |
| | Thickness (μm) | | 0.20 | 0.20 | 0.20 | 0.20 | 0.20 | 0.20 | 0.20 | 0.10 |
| Magnetic laye | 1-bromonaphthalene contact angle (°) | | 48.2 | 45.2 | 48.6 | 52.5 | 54.1 | 54.2 | 46.8 | 47.9 |
| | Water contact angle (°) | | 97.6 | 96.5 | 96.2 | 97.8 | 98.1 | 97.9 | 101.2 | 97.8 |
| Backcoat layer | 1-bromonaphthalene contact angle (°) | | 20.2 | 11.3 | 19.8 | 20.8 | 20.5 | 29.7 | 19.8 | 16.4 |
| Evaluation of head surface deposits after the acceleration test equivalent to long-term storage | | | A | A | A | A | A | A | A | A |

Based on a comparison of the Examples and Comparative Examples 1 to 7 shown in Table 2, it can be determined that establishing a range of 45.0 to 55.00 for the 1-bromonaphthalene contact angle on the surface of the magnetic layer and establishing a range of 10.0° to 30.0° for the 1-bromonaphthalene contact angle measured on the surface of the backcoat layer makes it possible to inhibit the generation of head surface deposits following the acceleration test equivalent to long-term storage in a magnetic tape having a backcoat layer with a thickness of less than or equal to 0.20 μm.

In Reference Example 1 in which the thickness of the backcoat layer was 0.30 μm, there was little head surface deposit generation with repeated running following the above long-term storage even when the 1-bromonaphthalene storage contact angle measured for the surface of the backcoat layer was outside the range of 10.0° to 30.0°. Based on these results, it was determined that the generation of head surface deposits following the acceleration test equivalent to long-term storage could be inhibited by keeping the 1-bromonaphthalene contact angle measured on the surface of the magnetic layer and the 1-bromonaphthalene contact angle measured on the surface of the backcoat layer within the respective ranges set forth above in a magnetic tape having a backcoat layer less than or equal to 0.20 μm in thickness.

The evaluation result for head edge deposits was "4" in Example 1 and "1" in Example 7. Example 7 is an example in which just lubricant was employed as the 1-bromonaphthalene contact angle-adjusting component in the magnetic layer. The head edge deposits determined in Example 7 were thought to be lubricant transferred from the surface of the magnetic layer.

An aspect of the present invention is useful in the technical field of magnetic tapes employed as archive recording media.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
   which comprises a magnetic layer comprising ferromagnetic powder and binder on one surface of a nonmagnetic support and comprises a backcoat layer comprising nonmagnetic powder and binder on the other surface of the nonmagnetic support, wherein:
   the backcoat layer comprises a polymer containing a polyalkyleneimine chain and a polyester chain;
   the thickness of the backcoat layer is less than or equal to 0.20 μm;
   the contact angle for 1-bromonaphthalene that is measured on a surface of the backcoat layer falls within a range of 10.0° to 30.0°; and
   the contact angle for 1-bromonaphthalene that is measured on a surface of the magnetic layer falls within a range of 45.0° to 55.0°.

2. The magnetic tape according to claim 1,
   wherein the thickness of the backcoat layer falls within a range of 0.05 μm to 0.20 μm.

3. The magnetic tape according to claim 1,
   wherein the contact angle for 1-bromonaphthalene that is measured on the surface of the backcoat layer falls within a range of 11.3° to 29.7°.

4. The magnetic tape according to claim 1,
   wherein the contact angle for 1-bromonaphthalene that is measured on the surface of the magnetic layer falls within a range of 45.2° to 54.2°.

5. The magnetic tape according to claim 1,
   wherein the contact angle for 1-bromonaphthalene that is measured on the surface of the backcoat layer falls within a range of 11.3° to 29.7°; and the contact angle for 1-bromonaphthalene that is measured on the surface of the magnetic layer falls within a range of 45.2° to 54.2°.

6. The magnetic tape according to claim 1,
wherein the magnetic layer further comprises a nitrogen-containing polymer.

7. The magnetic tape according to claim 6,
wherein the nitrogen-containing polymer is a polyalkyleneimine polymer.

8. The magnetic tape according to claim 7,
wherein the polyalkyleneimine polymer is a polymer containing a polyalkyleneimine chain and a polyester chain.

9. The magnetic tape according to claim 1,
wherein either one of, or both, the backcoat layer and the magnetic layer further comprise one or more lubricants selected from the group consisting of a fatty acid, a fatty acid ester, and a fatty acid amide.

10. The magnetic tape according to claim 1,
wherein the contact angle for water that is measured on the surface of the magnetic layer falls within a range of 90.0° to 101.2°.

11. The magnetic tape according to claim 1,
wherein the contact angle for water that is measured on the surface of the magnetic layer falls within a range of 96.2° to 101.2°.

12. The magnetic tape according to claim 1,
wherein the contact angle for 1-bromonaphthalene that is measured on the surface of the backcoat layer falls within a range of 11.3° to 29.7°;
the contact angle for 1-bromonaphthalene that is measured on the surface of the magnetic layer falls within a range of 45.2° to 54.2°; and
the contact angle for water that is measured on the surface of the magnetic layer falls within a range of 96.2° to 101.2°.

13. The magnetic tape according to claim 1,
wherein the nonmagnetic powder contained in the backcoat layer is selected from the group of inorganic powder and carbon black.

14. The magnetic tape according to claim 13,
wherein the nonmagnetic powder contained in the backcoat layer comprises at least carbon black.

15. The magnetic tape according to claim 1,
which comprises a nonmagnetic layer comprising nonmagnetic powder and binder between the nonmagnetic support and the magnetic layer.

* * * * *